US011963204B2

(12) United States Patent
Duan et al.

(10) Patent No.: US 11,963,204 B2
(45) Date of Patent: Apr. 16, 2024

(54) DOWNLINK POSITIONING REFERENCE SIGNAL CONFIGURATION AND PROCESSING IN FULL DUPLEX SCENARIOS

(71) Applicant: QUALCOMM Incorporated, San Diego, CA (US)

(72) Inventors: Weimin Duan, San Diego, CA (US); Alexandros Manolakos, Escondido, CA (US); Seyedkianoush Hosseini, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/327,330

(22) Filed: Jun. 1, 2023

(65) Prior Publication Data
US 2023/0309128 A1 Sep. 28, 2023

Related U.S. Application Data

(63) Continuation of application No. 17/201,291, filed on Mar. 15, 2021, now Pat. No. 11,711,827.
(Continued)

(51) Int. Cl.
*H04W 72/51* (2023.01)
*H04L 5/00* (2006.01)
(Continued)

(52) U.S. Cl.
CPC ........... *H04W 72/51* (2023.01); *H04L 5/0051* (2013.01); *H04L 27/26025* (2021.01);
(Continued)

(58) Field of Classification Search
None
See application file for complete search history.

(56) References Cited

U.S. PATENT DOCUMENTS

2012/0122472 A1\* 5/2012 Krishnamurthy ..... H04L 5/0053
455/456.1
2014/0171097 A1 6/2014 Fischer et al.
(Continued)

FOREIGN PATENT DOCUMENTS

WO 2015060620 A1 4/2015
WO 2019215288 A1 11/2019

OTHER PUBLICATIONS

International Search Report and Written Opinion—PCT/US2021/022461—ISA/EPO—dated Jun. 18, 2021.

*Primary Examiner* — Otis L Thompson, Jr.
(74) *Attorney, Agent, or Firm* — Sunstein LLP/Qualcomm

(57) ABSTRACT

Techniques are provided for utilizing positioning reference signals (PRS) in full duplex scenarios. An example method for wireless communication by a user equipment (UE) includes receiving a positioning reference signal in a time slot, wherein the positioning reference signal spans a first frequency bandwidth, transmitting a signal in a second frequency bandwidth during the time slot, wherein the second frequency bandwidth includes frequencies within the first frequency bandwidth, and processing the positioning reference signal received in the first frequency bandwidth excluding the frequencies in the second frequency bandwidth.

16 Claims, 19 Drawing Sheets

Related U.S. Application Data

(60) Provisional application No. 63/007,493, filed on Apr. 9, 2020.

(51) Int. Cl.
*H04L 27/26* (2006.01)
*H04W 72/0453* (2023.01)
*H04W 76/27* (2018.01)

(52) U.S. Cl.
CPC ..... *H04L 27/2607* (2013.01); *H04W 72/0453* (2013.01); *H04W 76/27* (2018.02)

(56) References Cited

U.S. PATENT DOCUMENTS

| | | |
|---|---|---|
| 2014/0334456 A1* | 11/2014 | Mukherjee .............. H04W 4/90 |
| | | 370/336 |
| 2016/0223639 A1 | 8/2016 | Davydov et al. |
| 2017/0332340 A1 | 11/2017 | Noh et al. |
| 2018/0212746 A1 | 7/2018 | Kazmi et al. |
| 2018/0343132 A1 | 11/2018 | Maheshwari et al. |
| 2019/0037338 A1 | 1/2019 | Edge et al. |
| 2019/0052504 A1* | 2/2019 | Hayashi ............ H04W 72/0453 |
| 2020/0092737 A1* | 3/2020 | Siomina ................... H04W 8/24 |
| 2021/0297216 A1* | 9/2021 | Shreevastav ............... G01S 1/20 |
| 2021/0321387 A1 | 10/2021 | Duan et al. |
| 2021/0321402 A1* | 10/2021 | Chen ..................... H04W 64/00 |
| 2022/0026517 A1* | 1/2022 | Hasegawa ............ G01S 13/765 |
| 2022/0123879 A1 | 4/2022 | Munier et al. |

\* cited by examiner

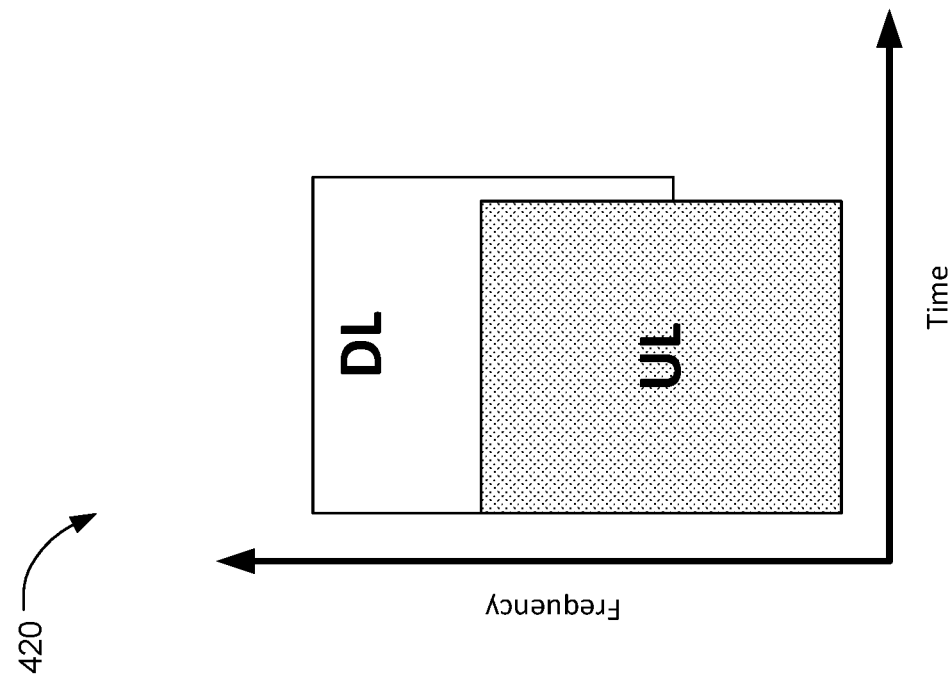
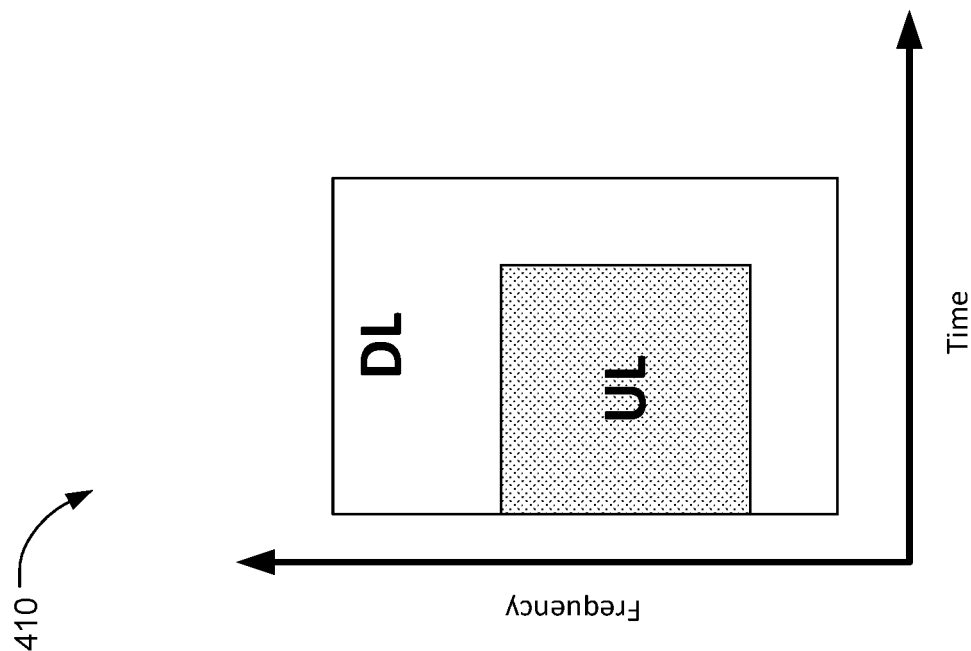
FIG. 4A

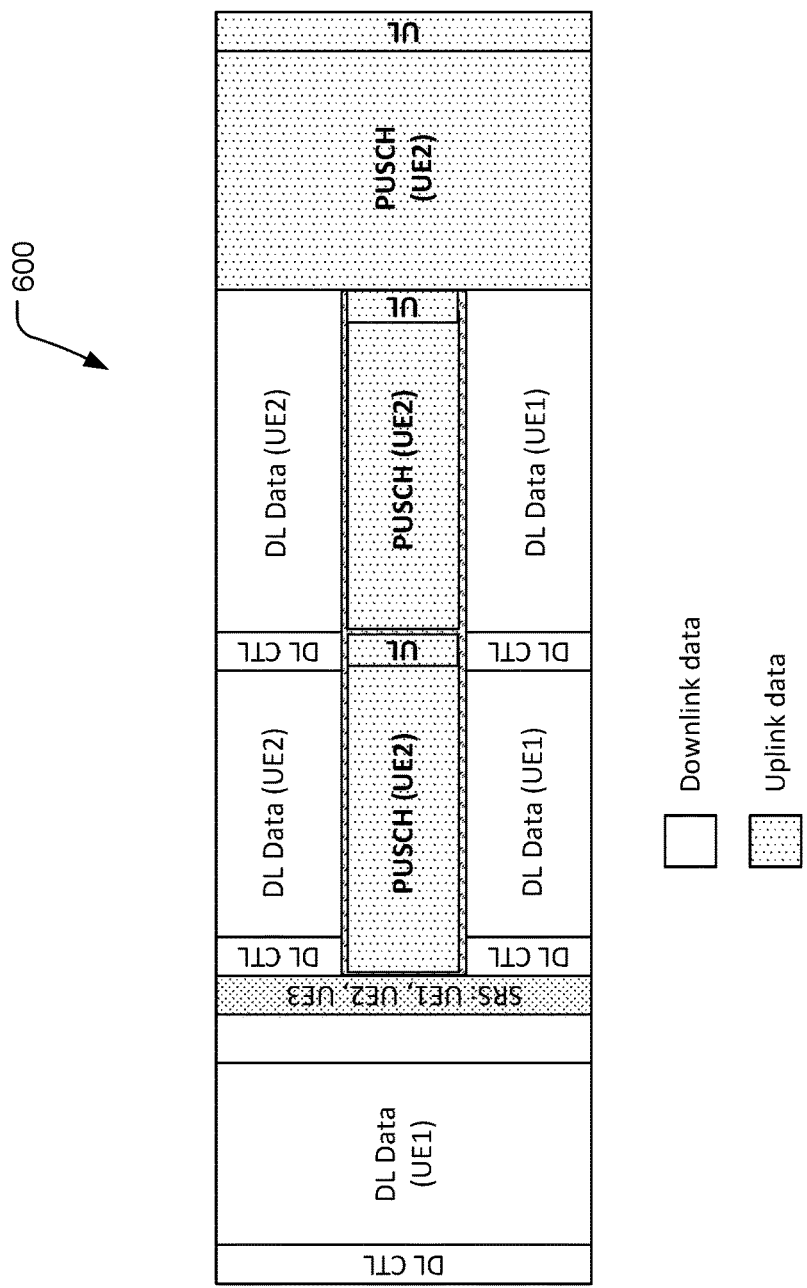
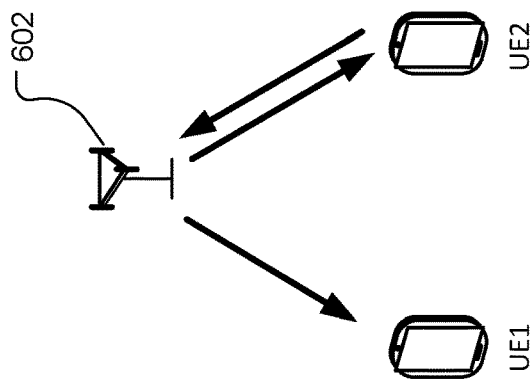
FIG. 6

DOWNLINK POSITIONING REFERENCE SIGNAL CONFIGURATION AND PROCESSING IN FULL DUPLEX SCENARIOS

CROSS-REFERENCE TO RELATED APPLICATION

This application is a continuation of U.S. patent application Ser. No. 17/201,291, filed Mar. 15, 2021, entitled "DOWNLINK POSITIONING REFERENCE SIGNAL CONFIGURATION AND PROCESSING IN FULL DUPLEX SCENARIOS," which claims the benefit of U.S. Provisional Application No. 63/007,493, filed Apr. 9, 2020, entitled "DOWNLINK POSITIONING REFERENCE SIGNAL CONFIGURATION AND PROCESSING IN FULL DUPLEX SCENARIOS," each of which is assigned to the assignee hereof and of which the entire contents are hereby incorporated herein by reference for all purposes.

BACKGROUND

Field of the Disclosure

Aspects of the present disclosure relate to wireless communications, and more particularly, to techniques for user equipment(s) to utilize positioning reference signal with full duplex operations.

Description of Related Art

Wireless communication systems are widely deployed to provide various telecommunication services such as telephony, video, data, messaging, broadcasts, positioning, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Fifth Generation New Radio systems (5G NR), Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

Obtaining the location or position of a mobile device that is accessing a wireless communication system may be useful for many applications including, for example, emergency calls, personal navigation, asset tracking, locating a friend or family member, etc. Existing position methods include methods based on measuring radio signals transmitted from a variety of devices including satellite vehicles (SVs) and terrestrial radio sources in a wireless network such as base stations and access points. In methods based on terrestrial radio sources, a mobile device may measure the timing of signals received from two or more base stations and determine times of arrival, time differences of arrival and/or receive time-transmit time differences. Combining these measurements with known locations for the base stations and known transmission times from each base station may enable location of the mobile device using such position methods as Observed Time Difference Of Arrival (OTDOA) or Enhanced Cell ID (ECID).

To further help location determination (e.g. for OTDOA), Positioning Reference Signals (PRS) may be transmitted by base stations in order to increase both measurement accuracy and the number of different base stations for which timing measurements can be obtained by a mobile device. In general, the base stations and mobile devices may communicate using half duplex operation which sequentially utilize either downlink channels (e.g., for transmissions from a base station to a mobile device) or uplink channels (e.g., for transmissions from a mobile device to a base station). Emerging technologies, however, will enable full duplex operations in which a base station or mobile device may communicate on downlink and uplink channels simultaneously. Full duplex operations may diminish the efficiency of terrestrial positioning processes.

SUMMARY

An example method for wireless communication by a user equipment (UE) according to the disclosure includes receiving a positioning reference signal in a time slot, wherein the positioning reference signal spans a first frequency bandwidth, transmitting a signal in a second frequency bandwidth during the time slot, wherein the second frequency bandwidth includes frequencies within the first frequency bandwidth, and processing the positioning reference signal received in the first frequency bandwidth excluding the frequencies in the second frequency bandwidth.

Implementations of such a method may include one or more of the following features. The time slot may be a symbol slot. The positioning reference signal may be received from a first base station and the signal transmitted in the second frequency bandwidth may be transmitted to the first base station. The positioning reference signal may be received from a first base station and the signal transmitted in the second frequency bandwidth may be transmitted to a second base station. One or more radio resource control signals may be received to configure the first frequency bandwidth and the second frequency bandwidth. Processing the positioning reference signal may include comparing the positioning reference signal received in the first frequency bandwidth to a previous positioning reference signal received in a prior time slot. The time slot may be approximately between 1 and 6 milliseconds in duration. The positioning reference signal may be one of a plurality of positioning reference signals received by the user equipment, such that each of the plurality of positioning reference signals have the same subcarrier spacing and cyclic prefix.

An example method for wireless communication by a user equipment (UE) according to the disclosure includes receiving a positioning reference signal in a downlink resource bandwidth part, transmitting a signal in an uplink resource bandwidth part, wherein the uplink resource bandwidth part overlaps at least a portion of the downlink resource bandwidth part, and processing the positioning reference signal received in a portion of the downlink resource bandwidth part which does not overlap with the uplink resource bandwidth part.

Implementations of such a method may include one or more of the following features. The positioning reference signal may be received from a first base station and the signal in the uplink resource bandwidth part may be transmitted to the first base station. The positioning reference signal may be received from a first base station and the signal in the uplink resource bandwidth part may be transmitted to a second base station. One or more radio resource control signals may be received to configure the downlink resource bandwidth part and the uplink resource bandwidth part. One or more downlink control information signals may be received to configure the downlink resource bandwidth part and the uplink resource bandwidth part. The positioning reference signal may be received in a first time slot and processing the positioning reference signal may include comparing the positioning reference signal received in the first time slot to a previous positioning reference signal received in a prior time slot. The first time slot may be approximately between 1 and 6 milliseconds in duration. The positioning reference signal may be one of a plurality of positioning reference signals received by the user equipment, such that each of the plurality of positioning reference signals have the same subcarrier spacing and cyclic prefix. The downlink resource bandwidth part may comprise a disjoint set of frequency resources.

An example method for wireless communication by a base station according to the disclosure configuring a first positioning frequency layer for full duplex operation, configuring a second positioning frequency layer for half duplex operation, providing the first positioning frequency layer to a first mobile device, and providing the second positioning frequency layer to a second mobile device.

Implementations of such a method may include one or more of the following features. The first positioning frequency layer and the second positioning frequency layer may comprise one or more positioning reference signal resource sets with each positioning reference signal resource sets comprising the same subcarrier spacing and cyclic prefix. Configuring the first positioning frequency layer for full duplex operation may include configuring a slot class field to indicate full duplex operation. Configuring the second positioning frequency layer for half duplex operation may comprise configuring a slot class field to indicate half duplex operation. Providing the first positioning frequency layer to the first mobile device and providing the second positioning frequency layer to the second mobile device may include transmitting one or more radio resource control signals to the first mobile device and the second mobile device.

An example apparatus for wireless communication according to the disclosure includes a memory, at least one transceiver, and at least one processor communicatively coupled to the memory and the at least one transceiver, such that the at least one transceiver is configured to receive a positioning reference signal in a time slot, wherein the positioning reference signal spans a first frequency bandwidth, and transmit a signal in a second frequency bandwidth during the time slot, wherein the second frequency bandwidth includes frequencies within the first frequency bandwidth, and at least one processor is configured to process the positioning reference signal received in the first frequency bandwidth excluding the frequencies in the second frequency bandwidth.

An example apparatus for wireless communication according to the disclosure includes a memory, at least one transceiver, and at least one processor communicatively coupled to the memory and the at least one transceiver, such that the at least one transceiver is configured to receive a positioning reference signal in a downlink resource bandwidth part, and transmit a signal in an uplink resource bandwidth part, wherein the uplink resource bandwidth part overlaps at least a portion of the downlink resource bandwidth part, and the at least one processor is configured to process the positioning reference signal received in a portion of the downlink resource bandwidth part which does not overlap with the uplink resource bandwidth part.

An example apparatus for wireless communication according to the disclosure include a memory, at least one transceiver, at least one processor operably coupled to the at least one transceiver and the memory and configured to configure a first positioning frequency layer for full duplex operation, configure a second positioning frequency layer for half duplex operation, provide the first positioning frequency layer to a first mobile device, and provide the second positioning frequency layer to a second mobile device.

An example apparatus for wireless communication by a user equipment (UE) according to the disclosure include means for receiving a positioning reference signal in a time slot, wherein the positioning reference signal spans a first frequency bandwidth, means for transmitting a signal in a second frequency bandwidth during the time slot, wherein the second frequency bandwidth includes frequencies within the first frequency bandwidth, and means for processing the positioning reference signal received in the first frequency bandwidth excluding the frequencies in the second frequency bandwidth.

An example apparatus for wireless communication by a user equipment (UE) according to the disclosure includes means for receiving a positioning reference signal in a downlink resource bandwidth part, means for transmitting a signal in an uplink resource bandwidth part, wherein the uplink resource bandwidth part overlaps at least a portion of the downlink resource bandwidth part, and means for processing the positioning reference signal received in a portion of the downlink resource bandwidth part which does not overlap with the uplink resource bandwidth part.

An example apparatus for wireless communication by a base station according to the disclosure includes means for configuring a first positioning frequency layer for full duplex operation, means for configuring a second positioning frequency layer for half duplex operation, means for providing the first positioning frequency layer to a first mobile device, and means for providing the second positioning frequency layer to a second mobile device.

An example of a non-transitory processor-readable storage medium comprising processor-readable instructions configured to cause one or more processors in a user equipment (UE) to communicate wirelessly according to the disclosure include code for receiving a positioning reference signal in a time slot, wherein the positioning reference signal spans a first frequency bandwidth, code for transmitting a signal in a second frequency bandwidth during the time slot, wherein the second frequency bandwidth includes frequencies within the first frequency bandwidth, and code for processing the positioning reference signal received in the first frequency bandwidth excluding the frequencies in the second frequency bandwidth.

An example of a non-transitory processor-readable storage medium comprising processor-readable instructions configured to cause one or more processors in a user equipment (UE) to communicate wirelessly according to the disclosure includes code for receiving a positioning reference signal in a downlink resource bandwidth part, code for transmitting a signal in an uplink resource bandwidth part, wherein the uplink resource bandwidth part overlaps at least a portion of the downlink resource bandwidth part, and code for processing the positioning reference signal received in a portion of the downlink resource bandwidth part which does not overlap with the uplink resource bandwidth part.

An example of a non-transitory processor-readable storage medium comprising processor-readable instructions configured to cause one or more processors in a user equipment (UE) to communicate wirelessly according the disclosure includes code for configuring a first positioning frequency layer for full duplex operation, code for configuring a second positioning frequency layer for half duplex operation, code for providing the first positioning frequency layer to a first mobile device, and code for providing the second positioning frequency layer to a second mobile device.

Items and/or techniques described herein may provide one or more of the following capabilities, as well as other capabilities not mentioned. Base stations and user equipment may be configured for full duplex operations. A positioning frequency layer may include information classes designated for full duplex or half duplex operations. A frequency spectrum may have designated half duplex and full duplex regions. Positioning reference signal (PRS) resources in full duplex regions may be ignored by user equipment configured for half duplex operations. User equipment configured for full duplex operations may process the PRS resources in the downlink areas of the full duplex regions and ignore the portion of the PRS resources in the uplink areas. In an in-band full duplex operations, a portion of the downlink areas may overlap the uplink areas. A full duplex user equipment may ignore the portion of a PRS resources in the overlapped area. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

BRIEF DESCRIPTION OF THE DRAWINGS

FIGS. 4A & 4B show examples of different types of full duplex operation.

FIG. 6 illustrates an example spectrum for a full duplex base station and a full duplex mobile device.

DETAILED DESCRIPTION

Figure 1:
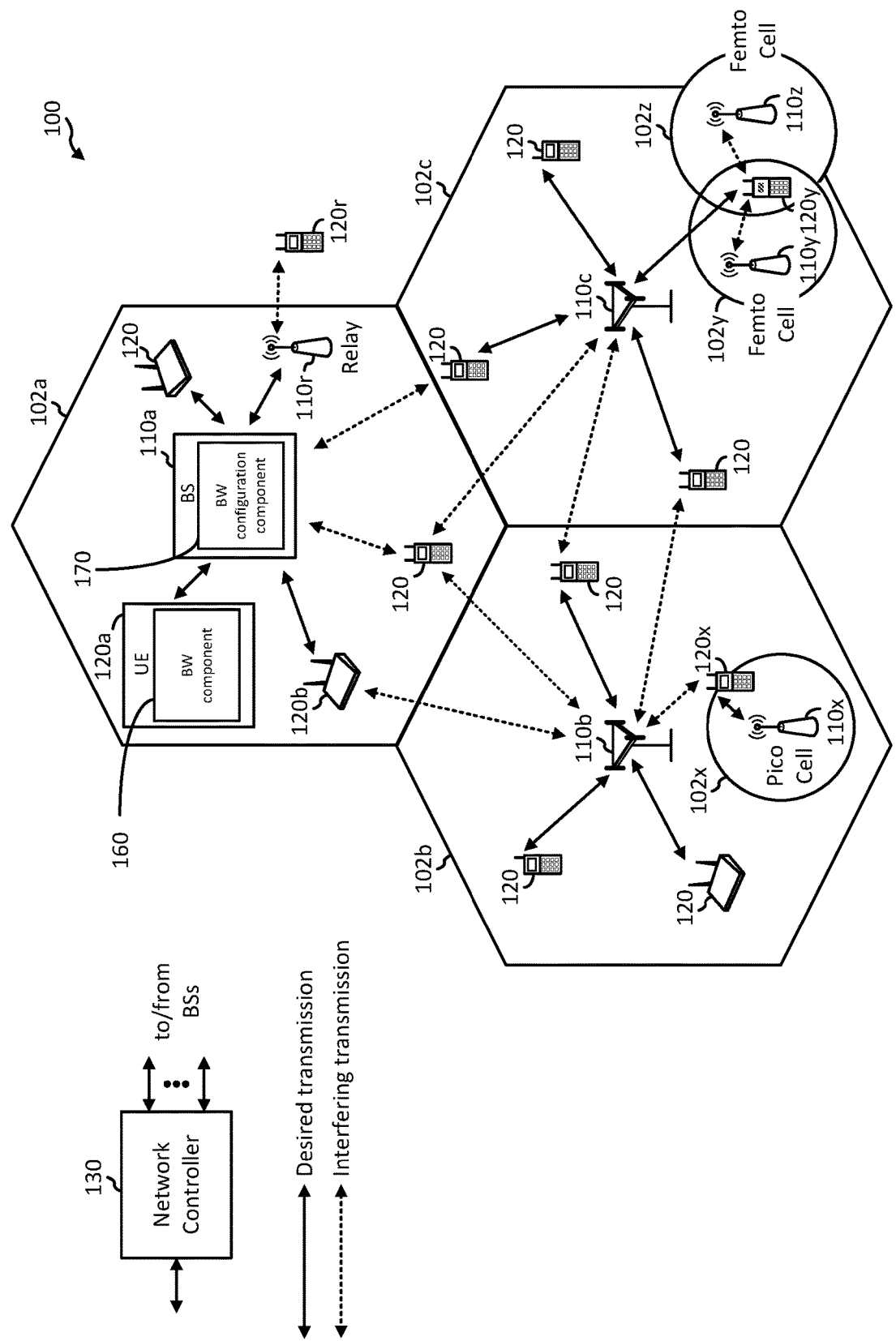
FIG. 1 is a block diagram conceptually illustrating an example telecommunications system.

Techniques are discussed herein for utilizing positioning reference signals (PRS) in full duplex scenarios. For example, a positioning frequency layer may include a collection of PRS resource sets across one or more base stations. The positioning reference signal (PRS) frequency layer may include information classes designated for full duplex or half duplex operations. A network may configure a first positioning frequency layer for full duplex operation and a second positioning frequency layer for half duplex operation. In an example, a PRS resource may span across downlink and uplink regions in a full duplex spectrum. A mobile device that is capable of only half duplex operation may ignore the spanning PRS resource. A mobile device that is full duplex capable may receive and process the portion of the spanning PRS in the downlink regions and ignore the portion of the spanning PRS in the uplink region. In an example, a down link PRS may be within a one or more downlink bandwidth parts in a sub-band full duplex configuration, and a mobile device may process the PRS resources in the downlink bandwidth parts. In an in-band full duplex configuration, where the uplink and downlink frequencies overlap, the mobile device may receive and process the PRS resources in the non-overlapped downlink bandwidth parts. In an example, side link channels (e.g., UE to UE) may be modified by the frequency layer to enable full duplex and/or half duplex operations. These techniques are examples only, and not exhaustive.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Fifth Generate New Radio (5G NR). 5G NR is an emerging wireless communications technology under development in conjunction with the 5G Technology Forum (5GTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The techniques described herein may be used for 5G NR wireless networks and radio technologies, as well as other wireless networks and radio technologies.

Referring to FIG. 1, an example wireless communication network 100 is shown. The wireless communication network 100 may be a full-duplex NR system (e.g., a full-duplex 5G network). In an example, a mobile device such as a User Equipment (UE) 120a has a bandwidth (BW) component 160 that may be configured for adapting an operating BW of the UE 120a. Similarly, a base station (BS) 110a may include a BW configuration component 170 that may configure a UE, such as UE 120a, to adapt an operating BW.

The wireless communication network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. The BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. A relay station 110r may communicate with the BS 110a and a UE 120r in order to facilitate communication between the BS 110a and the UE 120r. A relay station may also be referred to as a relay BS, a relay, etc.

Wireless communication network 100 may be a heterogeneous network that includes BSs of different types, e.g., macro BS, pico BS, femto BS, relays, etc. These different types of BSs may have different transmit power levels, different coverage areas, and different impact on interference in the wireless communication network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120a, 120b, 120x, 120y, etc.) may be dispersed throughout the wireless communication network 100, and each UE may be stationary or mobile. A UE may also be referred to as a mobile device, a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. NR may support transmitting positioning reference signals (PRS) in one or more slots as described herein.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum). In an example, a the sidelink signals may be configured for full duplex or half duplex operations. A position frequency layer may be used to facilitate full duplex and/or half duplex UE-to-UE transmissions for sidelink positioning applications.

In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

Figure 2:
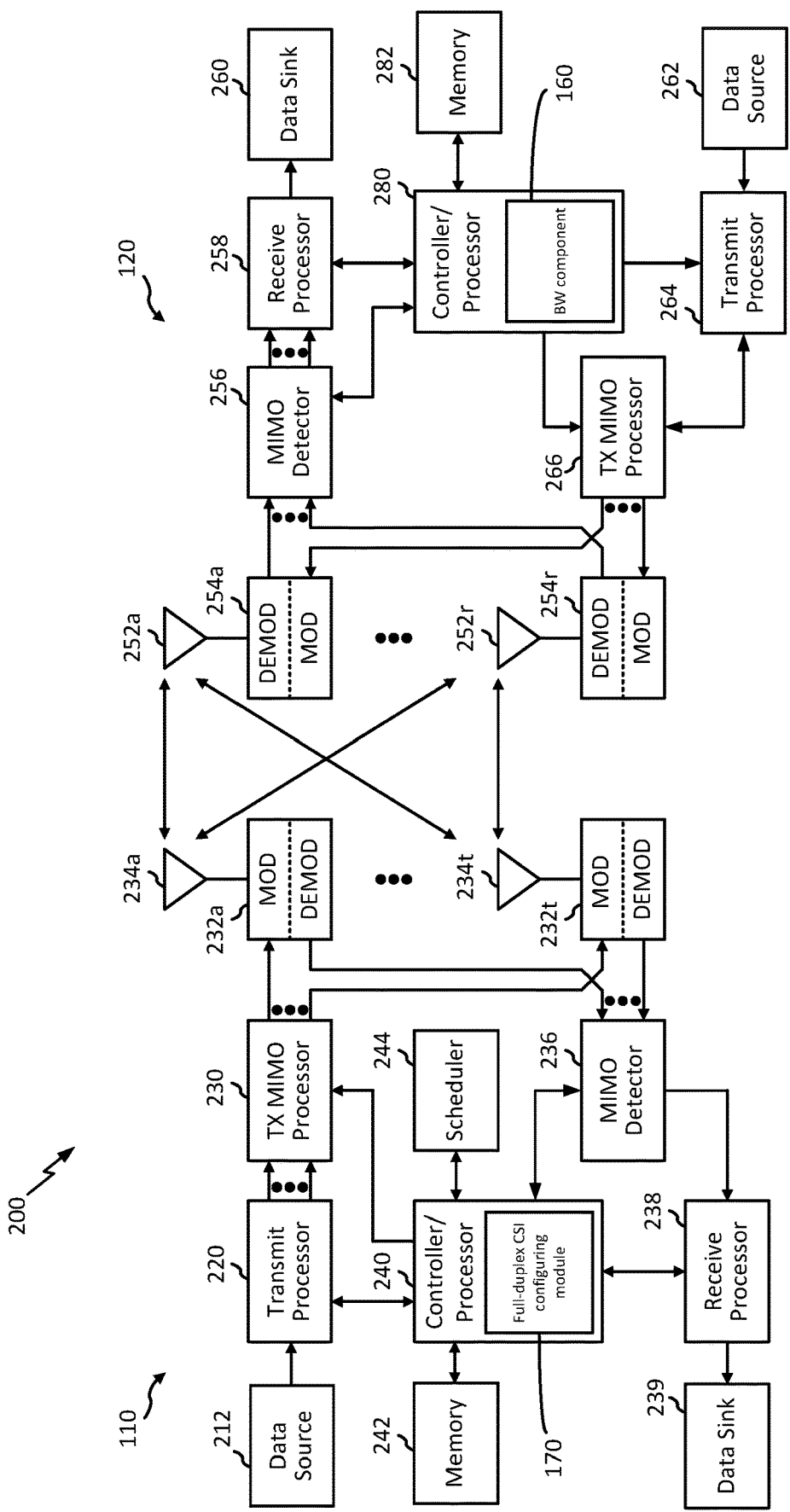
FIG. 2 is a block diagram illustrating an example architecture of a distributed radio access network (RAN), in accordance with certain aspects of the present disclosure.

Referring to FIG. 2, example components of BS 110 and UE 120 (e.g., in the wireless communication network 100 of FIG. 1) are shown. The components include antennas 252, processors 266, 258, 264, and/or controller/processor 280 of the UE 120 and/or antennas 234, processors 220, 230, 238, and/or controller/processor 240 of the BS 110 may be used to perform the various techniques and methods described herein.

At the BS 110, a transmit processor 220 may receive data from a data source 212 and control information from a controller/processor 240. For LTE systems, the control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), cell-specific reference signal (CRS), and positioning reference signal (PRS). For NR systems, the control information may include logical and transport channels including a broadcast control channel (BCCH), a paging control channel (PCCH), a common control channel (CCCH), a dedicated control channel (DCCH), a dedicated traffic channel (DTCH), a broadcast channel (BCH), a paging channel (PCH) and a downlink shared channel (DL-SCH). The physical channels in a 5G NR system may include a PBCH, PDCCH, and a PDSCH. The physical signals may include demodulate reference signals (DM-RS), phase tracking reference signal (PT-RS), a channel state information reference signal (CSI-RS), primary and secondary synchronization signals (PSS/SSS) and downlink PRS (DL PRS).

A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the BS 110 and the UE 120, respectively. The controller/processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

5G NR wireless networks are expected to provide ultra-high data rates and support a wide scope of application scenarios. Wireless full duplex (FD) communications is an emerging technique and is theoretically capable of doubling the link capacity when compared with half duplex (HD) communications. The main idea of wireless full duplex communications is to enable radio network nodes to transmit and receive simultaneously on the same frequency band in the same time slot and/or symbol slot. This contrasts with conventional half-duplex operation, where transmission and reception either differ in time or in frequency. The wireless communication network 100 may support various FD communication modes.

Figure 3A:
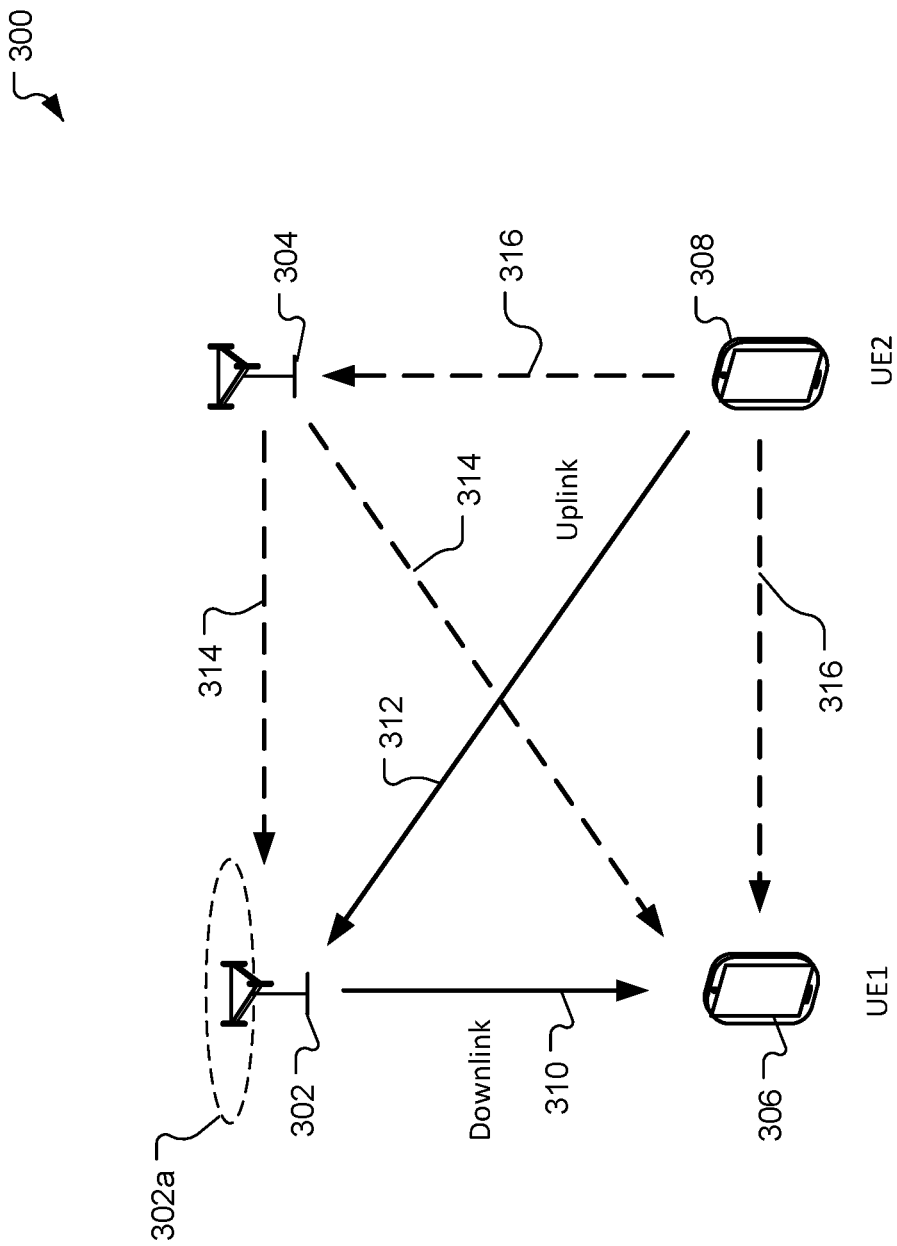
FIGS. 3A-3C illustrate different full duplex communication modes in a telecommunication system.

Referring to FIG. 3A, with further reference to FIGS. 1 and 2, an illustration 300 of full duplex communication mode with a full duplex base station and a half duplex UE is shown. The illustration includes the FD BS 302, a HD BS 304, a first HD UE 306, and a second HD UE 308. The FD BS 302 can communicate simultaneously in UL and DL with the two HD UEs 306, 308 using the same radio resources. For example, the FD BS 302 may communicate with the first HD UE 306 via the downlink 310 and with the second HD UE 308 with the uplink 312. The FD BS 302 may be susceptible to self-interference 302a from its downlink to uplink operation, as well as interference 312 from other gNBs such as the HD BS 304. The first HD UE 306 may be susceptible to interference 314 from the HD BS 304 and interference 316 from the second HD UE 308.

Figure 3B:
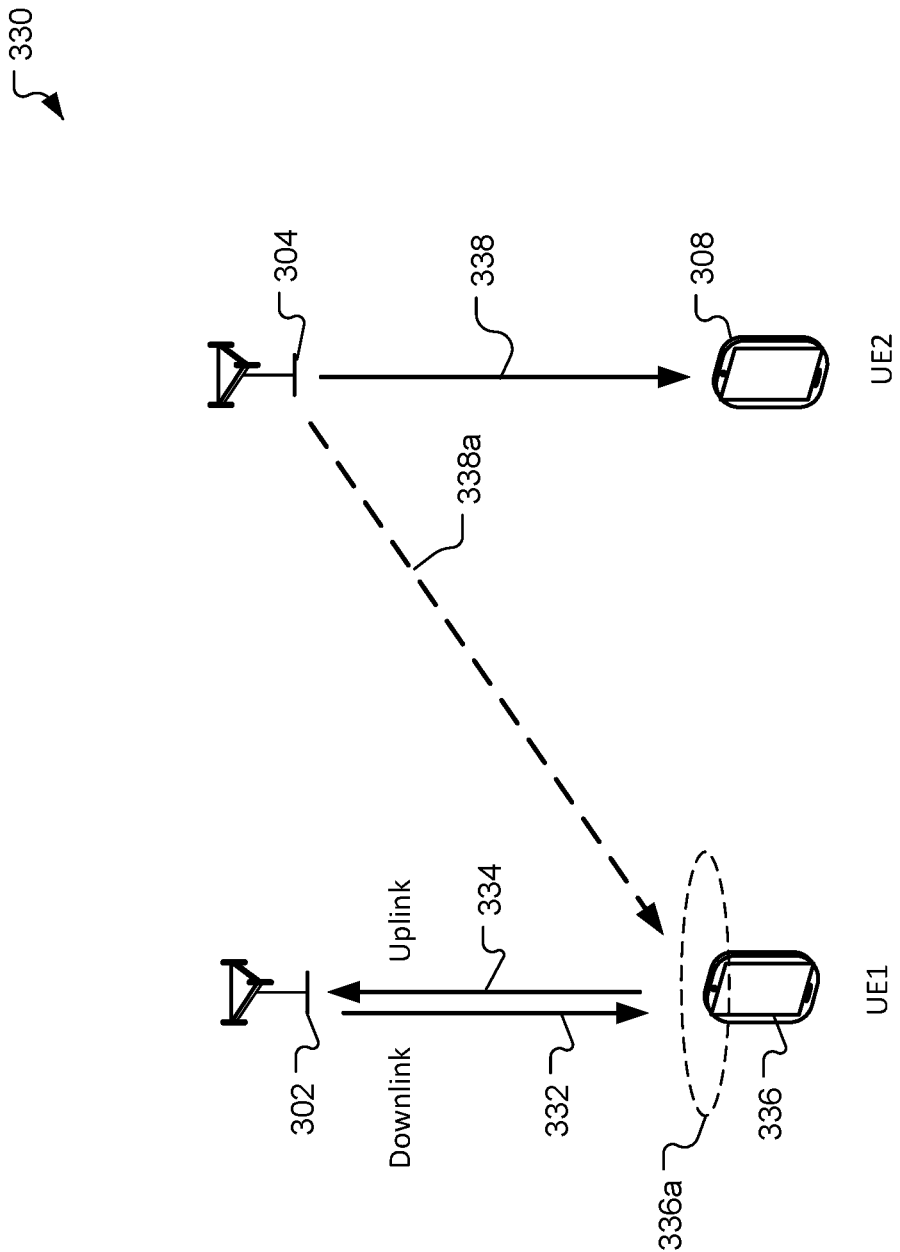

Referring to FIG. 3B, an illustration 330 of another full duplex communication mode with a full duplex base station and a full duplex UE is shown. The illustration 330 includes the FD BS 302, the HD BS 304, a FD UE 336, and the HD UE 308. The FD BS 302 and the FD UE 336 are configured to communicate simultaneously via an UL 334 and a DL 332 using the same radio resources. The HD BS 304 is communicating with the HD UE 308 via a DL 338. While communicating, the FD UE 336 may be susceptible to self-interference 336a, and interference 338a from other gNB(s) such as the HD BS 304. The FD UE 336 may also be susceptible to interference transmitting from the HD UE 308.

Figure 3C:
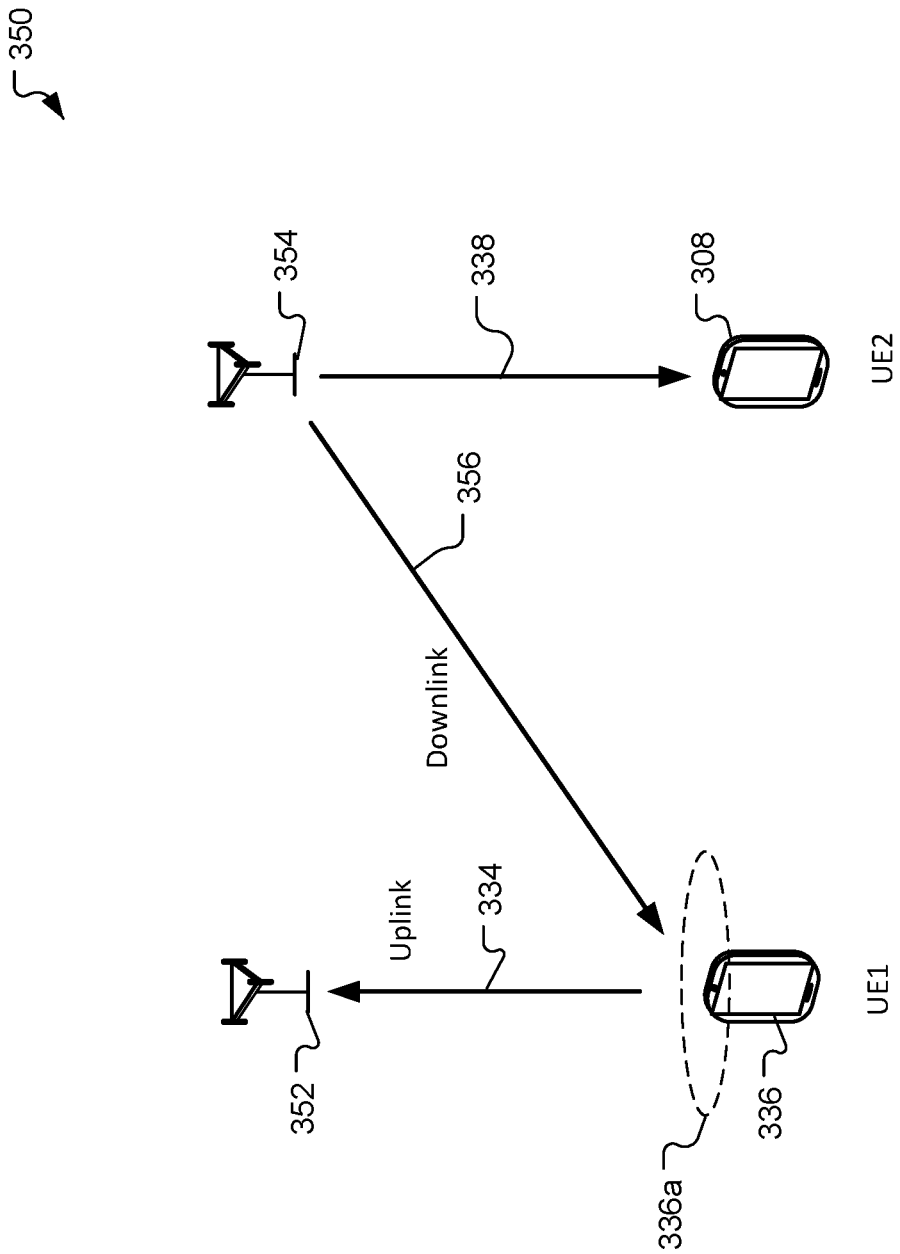

Referring to FIG. 3C, an illustration 350 of another full duplex communication mode with full duplex UE. The illustration 350 includes a first HD BS 352, a second HD BS 354, the FD UE 336 and the HD UE 308. The FD UE 336 is configured to communicate simultaneously in UL and DL with multiple transmission-reception points (e.g., multiple BSs) using the same radio resources. For example, the FD UE 336 may simultaneously communicate with the first HD BS 352 via the UL 334, and with the second HD BS 354 via the DL 356. The FD UE 336 may be susceptible to self-interference 336a from UL to DL operation. In an example, both UE1 336 and UE2 308 may be configured as FD UEs and capable of full duplex communications via device-to-device (D2D) sidelinks (e.g., PC5).

Figure 4B:
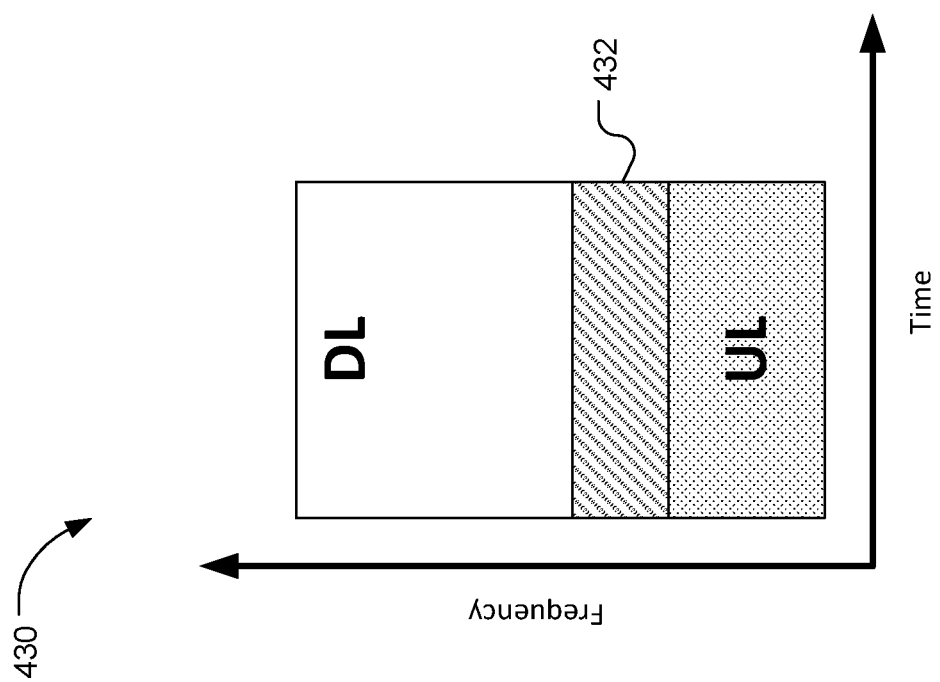

In addition to supporting various FD communication modes (also referred to herein as deployments), the wireless communication system may support various types of FD operation. In-band full duplex (IBFD), for example, is one type of FD operation in which devices can transmit and receive at the same time and on the same frequency resources. As shown in 410 of FIG. 4A, in one aspect, the DL and UL may fully share the same IBFD time/frequency resource (e.g., there may be a full overlap of the DL and UL allocations within the IBFD time/frequency resource). As shown in 420 of FIG. 4A, in one aspect, the DL and UL may partially share the same IBFD time/frequency resource (e.g., there may be a partial overlap of the DL and UL allocations within the IBFD time/frequency resource).

Sub-band FDD (also referred to as flexible duplex) is another type of FD operation in which devices can transmit and receive at the same time but on different frequency resources. Referring to the diagram 430 in FIG. 4B, the DL resource may be separated from the UL resource in the frequency domain by a guard band 432. This mode of operations reduces the self-interference cancellation requirements on the FD device since the leakage is lower.

Figure 5:
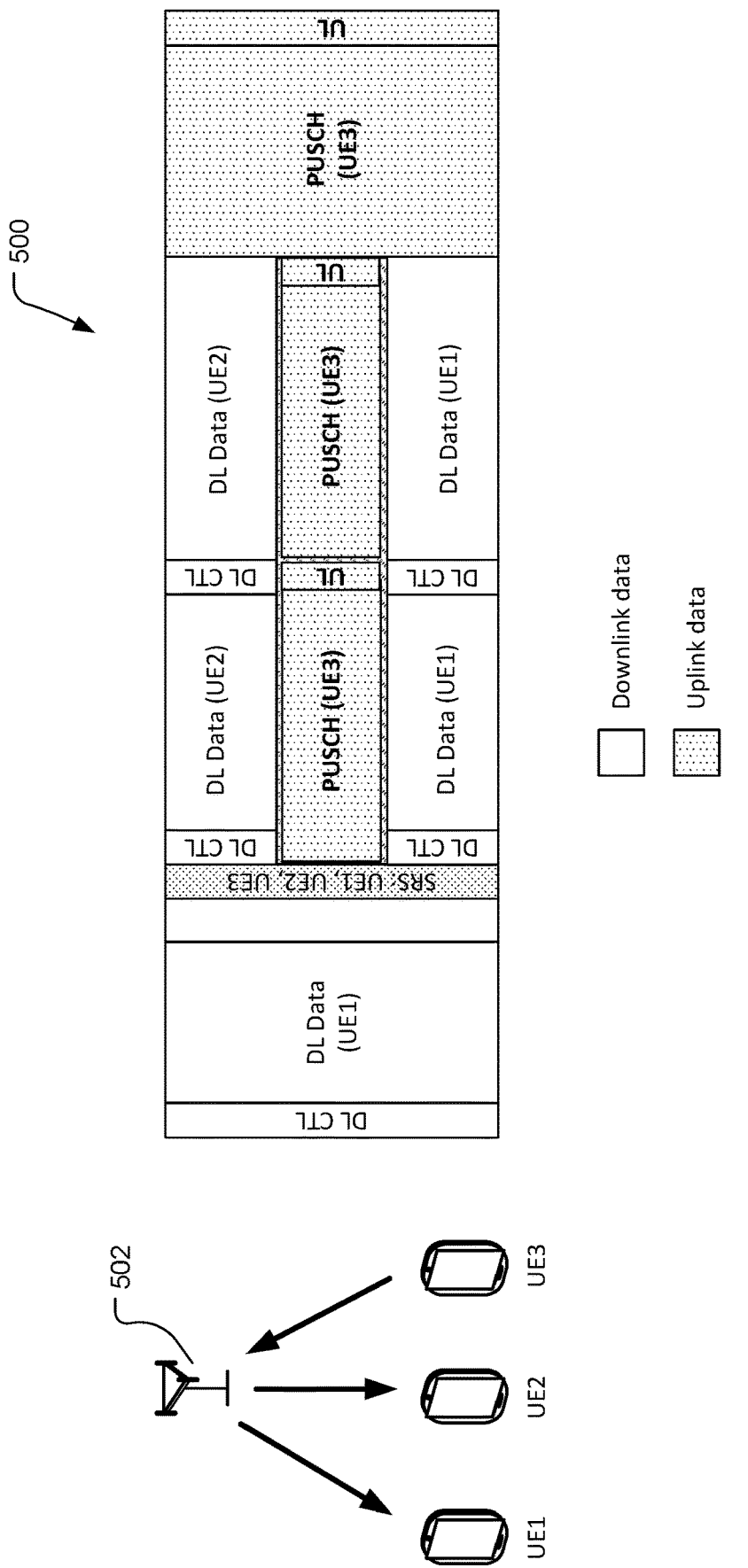
FIG. 5 illustrates an example spectrum for a full duplex base station and half duplex mobile devices.

Referring to FIG. 5, with further reference to FIGS. 1-4B, an example spectrum 500 for a full duplex base station and half duplex mobile devices is shown. In some aspects, there may be flexible DL/UL operation in time (across and within slots) and across multiple UEs. FIG. 5 illustrates an example use of time/frequency resources for a FD BS 502 (e.g., a gNB) and a plurality of HD UEs (e.g., UE1, UE2, and UE3). As shown in the spectrum 500, there may be simultaneous PDSCH and PUSCH grants for the same subframe/slot (for different UEs).

Referring to FIG. 6, with further reference to FIGS. 1-5, an example spectrum 600 for full duplex base station and a full duplex mobile device is shown. FIG. 6 illustrates another example use of time/frequency resources for a FD BS 602 and FD UEs. As shown in the spectrum 600, compared to spectrum 500 in FIG. 5, there may be simultaneous PDSCH and PUSCH grants for the same subframe/slots for the same UE (e.g., UE2) and/or different UEs. For example, for a FD UE (e.g., UE2) there may be a simultaneous UL and DL grant.

Figure 7:
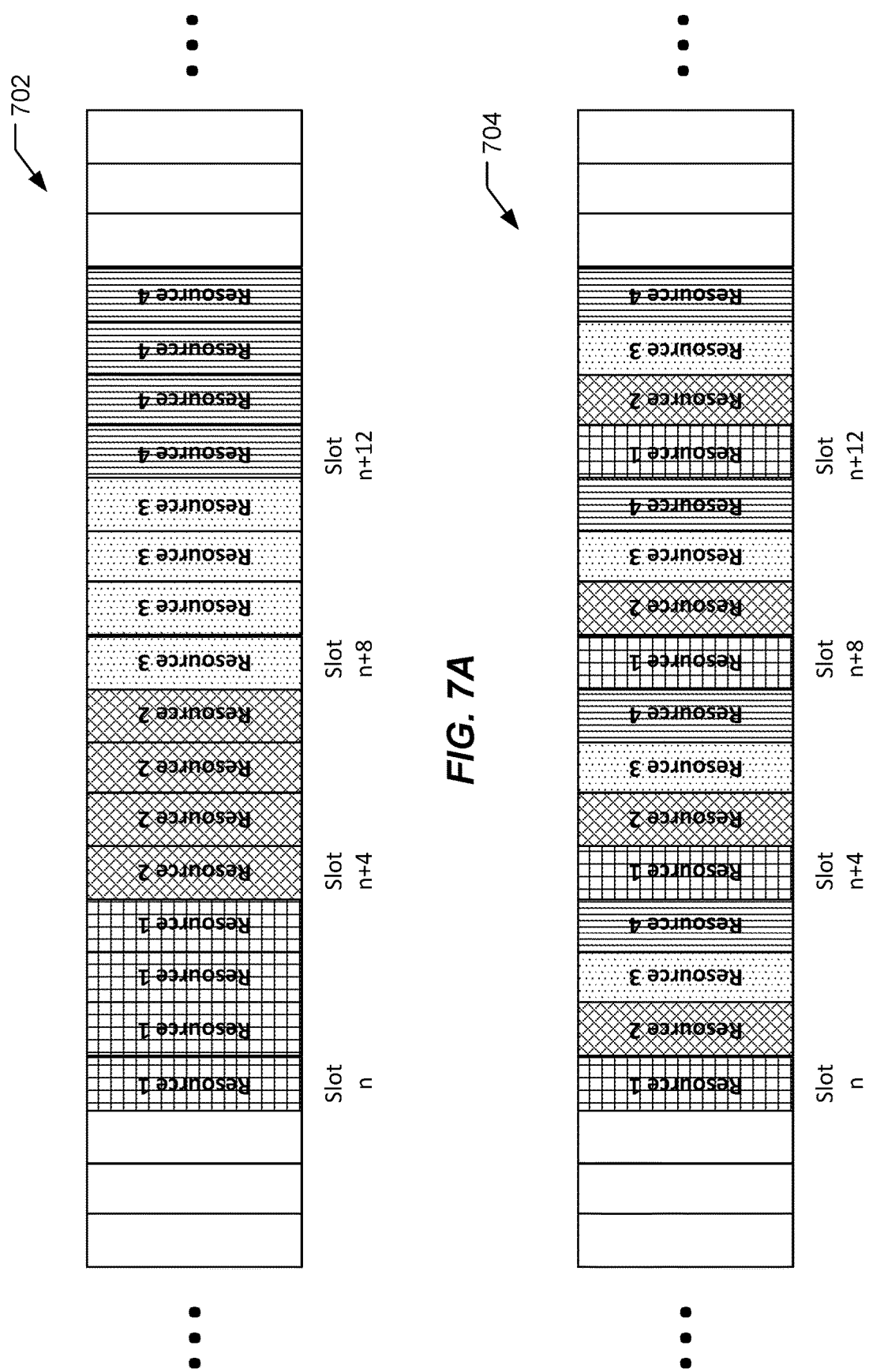
FIGS. 7A and 7B illustrates an example downlink positioning reference signal resource sets.

Referring to FIGS. 7A and 7B, an exemplary DL-PRS resource sets are shown. In general, a DL-PRS resource set is a collection of PRS resources across on base station (e.g., TRP) which have the same periodicity, a common muting pattern configuration and the same repetition factor across slots. A first DL-PRS resource set 702 includes 4 resources and a repetition factor of 4, with a time-gap equal to 1 slot. A second DL-PRS resource set 704 includes 4 resources and a repetition factor of 4 with a time-gap equal to 4 slots. The repetition factor indicates the number of times each PRS resource is repeated in each single instance of the PRS resource set (e.g., values of 1, 2, 4, 6, 8, 16, 32). The time-gap represents the offset in units of slots between two repeated instances of a DL PRS resource corresponding to the same PRS resource ID within a single instance of the DL PRS resource set (e.g., values of 1, 2, 4, 8, 16, 32). The time duration spanned by one DL PRS Resource set containing repeated DL PRS resources does not exceed PRS-periodicity. The repetition of a DL PRS resource enables receiver beam sweeping across repetitions and combining RF gains to increase coverage. The repetition may also enable intra-instance muting.

Figure 8:
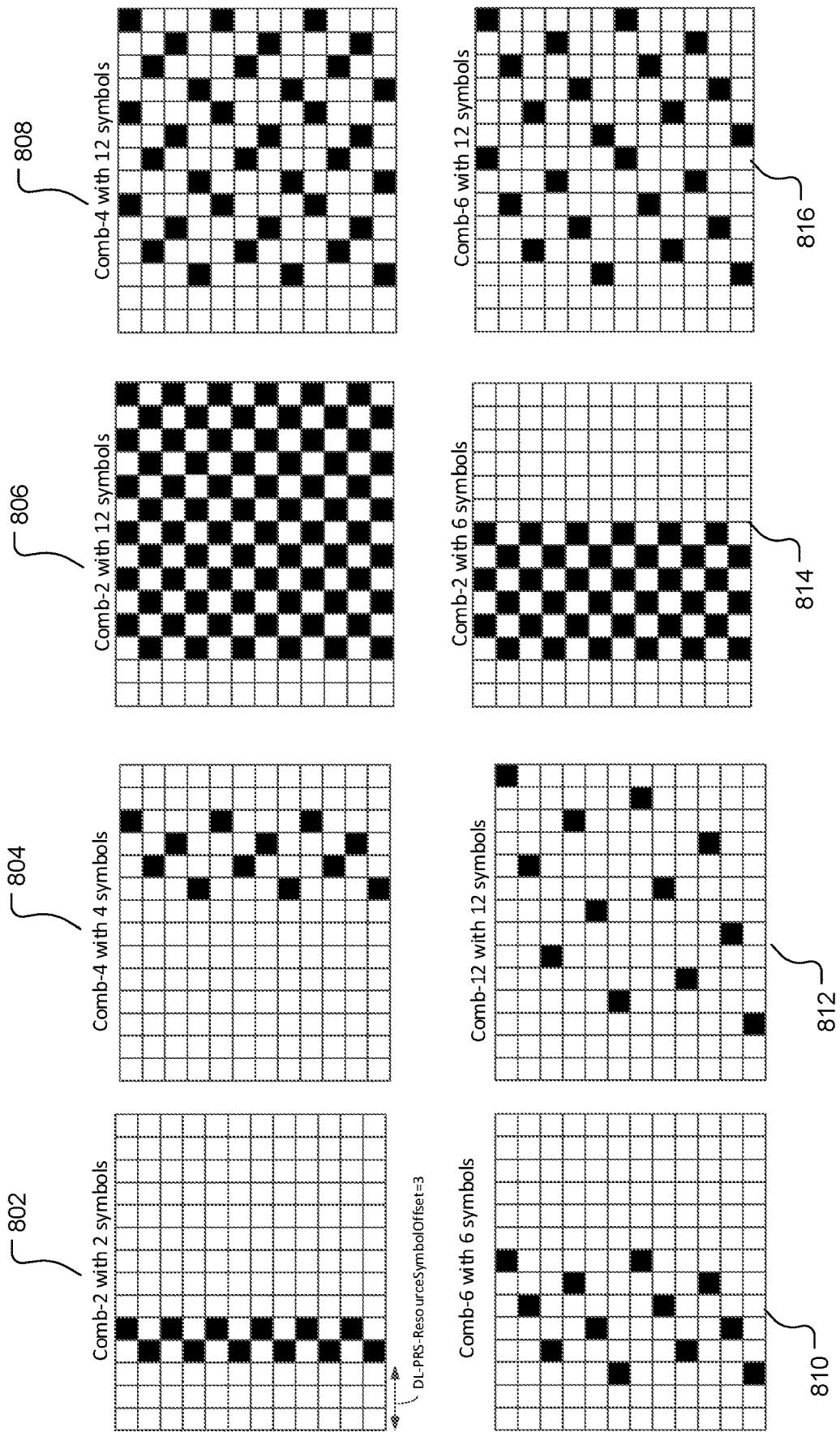
FIG. 8 illustrates example subframe and slot formats for positioning reference signal (PRS) transmission.

Referring to FIG. 8, example subframe and slot formats for positioning reference signal transmission are shown. The example subframe and slot formats are included in the DL-PRS resource sets depicted in FIGS. 7A and 7B. The subframes and slot formats in FIG. 8 are examples and not limitations and include a comb-2 with 2 symbols format 802, a comb-4 with 4 symbols format 804, a comb-2 with 12 symbols format 806, a comb-4 with 12 symbols format 808, a comb-6 with 6 symbols format 810, a comb-12 with 12 symbols format 812, a comb-2 with 6 symbols format 814, and a comb-6 with 12 symbols format 816. In general, a subframe may include 14 symbol periods with indices 0 to 13. The subframe and slot formats may be used for a Physical Broadcast Channel (PBCH). Typically, a base station may transmit the PRS from antenna port 6 on one or more slots in each subframe configured for PRS transmission. The base station may avoid transmitting the PRS on resource elements allocated to the PBCH, a primary synchronization signal (PSS), or a secondary synchronization signal (SSS) regardless of their antenna ports. The cell may generate reference symbols for the PRS based on a cell ID, a symbol period index, and a slot index. Generally, a UE may be able to distinguish the PRS from different cells.

A base station may transmit the DL PRS over a particular PRS bandwidth, which may be configured by higher layers. The base station may transmit the PRS on subcarriers spaced apart across the PRS bandwidth. The base station may also transmit the PRS based on the parameters such as PRS periodicity $T_{PRS}$, subframe offset APRs, and PRS duration $N_{PRS}$. PRS periodicity is the periodicity at which the PRS is transmitted. The PRS periodicity may be, for example, 160, 320, 640 or 1280 ms. Subframe offset indicates specific subframes in which the PRS is transmitted. And PRS duration indicates the number of consecutive subframes in which the PRS is transmitted in each period of PRS transmission (PRS occasion). The PRS duration may be, for example, 1, 2, 4 or 6 ms.

The PRS periodicity $T_{PRS}$ and the subframe offset APRs may be conveyed via a PRS configuration index $I_{PRS}$. The PRS configuration index and the PRS duration may be configured independently by higher layers. A set of $N_{PRS}$ consecutive subframes in which the PRS is transmitted may be referred to as a PRS occasion. Each PRS occasion may be enabled or muted, for example, the UE may apply a muting bit to each cell. Cells that may be muted in the next PRS occasion should not be measured. A PRS resource set is a collection of PRS resources across a base station which have the same periodicity, a common muting pattern configuration, and the same repetition factor across slots (e.g., 1, 2, 4, 6, 8, 16, 32 slots).

In an example, a positioning frequency layer may be a collection of PRS Resource Sets across one or more base stations. The positioning frequency layer may have the same subcarrier spacing (SCS) and cyclic prefix (CP) type, the same point-A, the same value of DL PRS Bandwidth, the same start PRB, and the same value of comb-size. The numerologies supported for PDSCH are supported for PRS.

Figure 9:
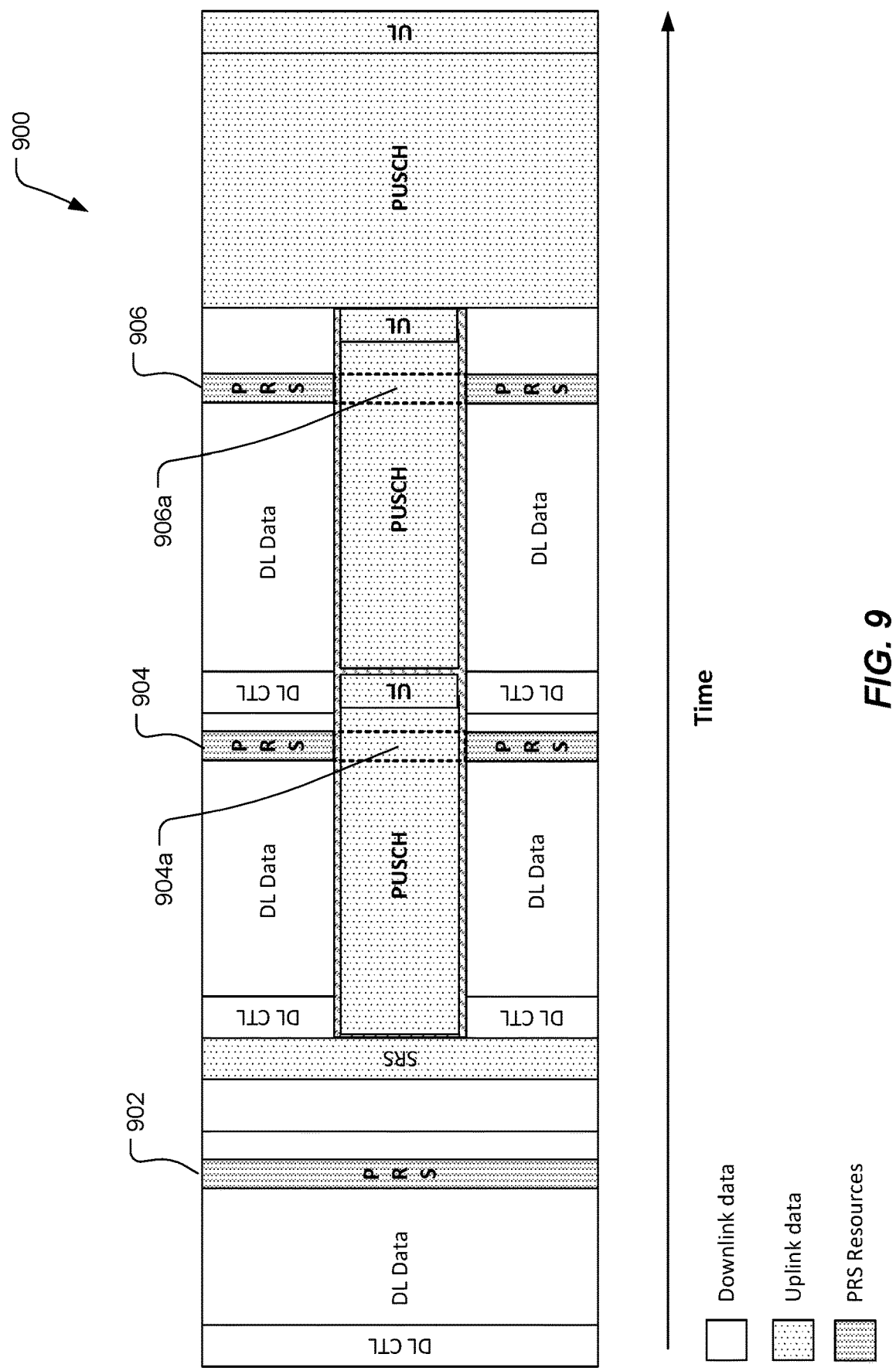
FIG. 9 illustrates an example spectrum for sub-band full duplex positioning reference signal (PRS) transmissions.

Referring to FIG. 9, an example spectrum 900 for sub-band full duplex positioning reference signals (PRS) is shown. The spectrum 900 is an example use of time/frequency resources of a FD UE, such as the full duplex spectrums 500, 600, with PRS resources added. For example, the spectrum 900 includes a first DL PRS transmission 902, a second DL PRS transmission 904 and a third DL PRS transmission 906. The first DL PRS transmission 902 occurs during a downlink region and is not overlapped with the uplink regions (e.g., PUSCH). The second and third DL PRS transmissions, 904, 906 are overlapped with the uplink regions. In prior systems, when not configured with a measurement gap, a UE was only required to measure DL PRS within an active DL BWP and with the same numerology as the active DL BWP. If the UE was not provided a measurement gap, then the UE was not expected to process the DL PRS resources on serving or non-serving cells on any symbols indicated as UL by the serving cell. Thus, in current systems, the second and third DL PRS transmissions 904, 906 will not be processed by the UE and hence they are wasted transmissions. The techniques provided herein overcome this limitation and enable a UE to process DL PRS resources in a full duplex spectrum.

In an example, a BS 110 or other resource in the wireless communications network 100 may configure the PRS resources based on whether a slot is in a half duplex (HD) region or a full duplex (FD) region. The positioning frequency layer may be expanded by including a field or other information element (IE) to indicate information of slot class (either HD or FD) in the definition of the positioning frequency layer. The positioning frequency layer may include a collection of PRS resource sets across one or more base stations (e.g., TRPs) with the same kind of HD or FD slots. The network may configure the PRS separately for FD operation and HD operation. For example, one positioning frequency layer may be configured for FD slots, and another positioning frequency layer may be provided for HD slots.

In another example, a PRS resource may be configured across a wide bandwidth and may span across HD and FD regions. In this example, a UE may be configured to process DL PRS resources based on the capabilities of the UE. For example, a UE may report its capability as an HD UE (i.e., cannot transmit and receive at the same time) or a FD UE (i.e., can transmit and receive at the same time). An HD UE may be configured to skip the DL PRS reception/processing that may occur during an UL region. For example, the HD UE may process the first DL PRS transmission 902 and skip the second and third DL PRS reception/processing (i.e., based on second and third DL PRS transmission 904, 906). A FD UE may be configured to process the DL PRS transmissions, or portions of the DL PRS transmissions, which do not collide with the UL sub-bands. For example, the FD UE may process the first, second and third DL PRS transmissions 902, 904, 906, excluding the first colliding sub-band portion 904a and the second colliding sub-band portion 906a. The processing of the second and third DL PRS transmissions 904, 906 while excluding the respective colliding sub-band portions 904a, 906a will produce a reasonable correlation peak and enable a position estimate. In an example, the process portions of the second and third DL PRS transmissions 904, 906 may be correlated with the first DL PRS transmissions 902 to generate a correlation peak.

Figure 10:
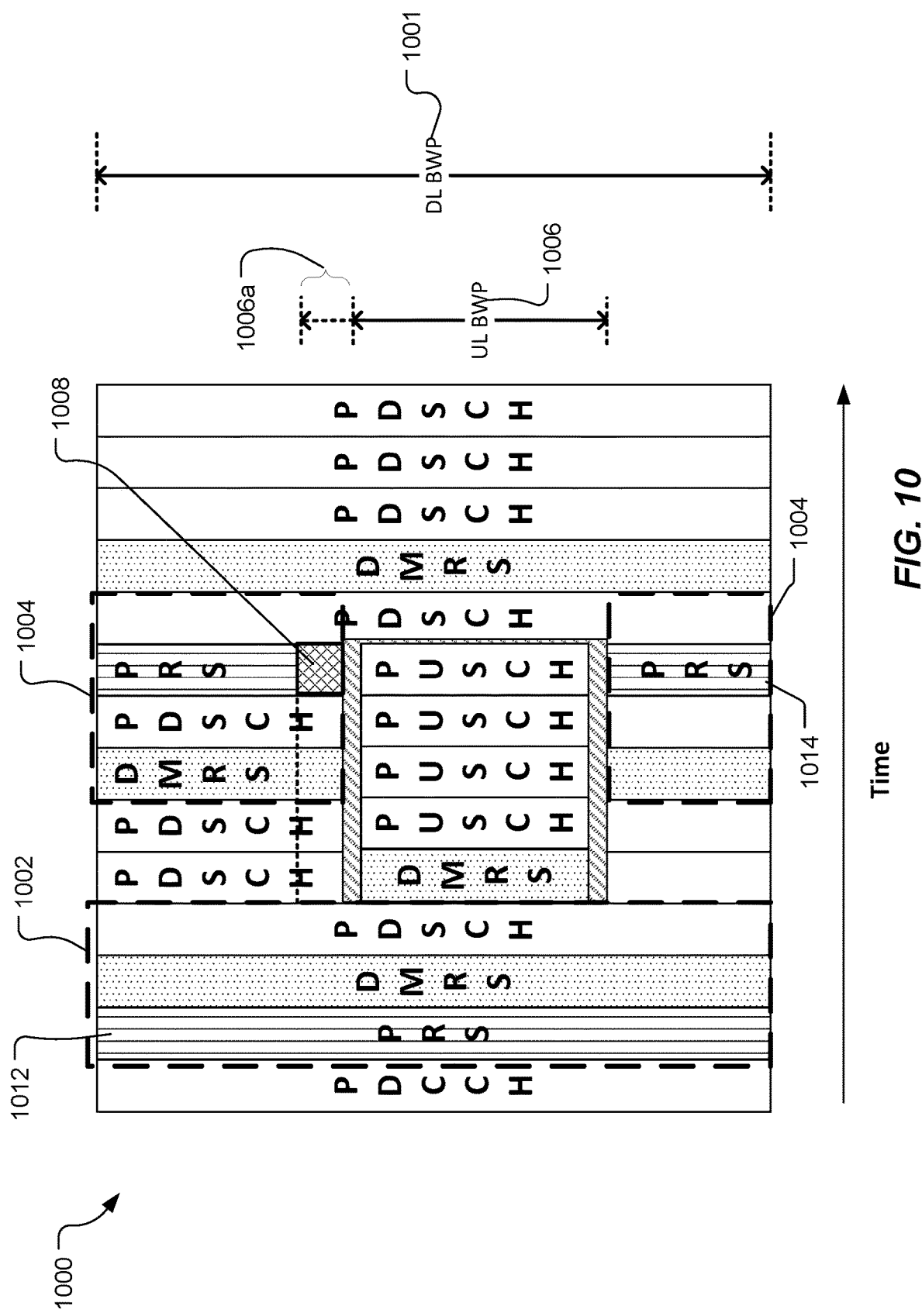
FIG. 10 illustrates an example spectrum for in-band full duplex positioning reference signal (PRS) transmissions.

Referring to FIG. 10, an example spectrum 1000 for in-band full duplex positioning reference signals (PRS) transmissions is shown. In an example, to avoid bandwidth part (BWP) switching delays, the DL PRS transmissions may be configured and processed within indicated resource bandwidths (BWs) within an active BWP. The active DL BWP 1001 may span across an active UL BWP 1006. A first resource BW 1002 and a second resource BW 1004 may be defined within the active DL BWP 1001. The second resource BW 1004 comprises a disjoint set of frequency resources across the DL BWP 1001 (i.e., it is not continuous throughout the DL BWP 1001). The second resource BW 1004 includes frequencies that are outside of the active UL BWP 1006. The resource BWs 1002, 1004 may be configured via radio resource control (RRC) signaling and the indication of the resource BWs may be dynamic (e.g., downlink control information (DCI) based). The first resource BW 1002 includes a first DL PRS transmission 1012, and the second resource BW 1004 includes a second DL PRS transmission 1014. In current systems, if a PRS measurement gap is not provided, a UE is not expected to measure a DL PRS which does not utilize the whole active DL BWP 1001. Thus, a current UE may utilize the first DL PRS transmission 1012 but not the second DL PRS transmission 1014.

In an example, the UEs may be configured based on their capabilities as an HD UE or a FD UE. A HD UE may be configured to process the first DL PRS transmission 1012 and to skip the second DL PRS reception/processing (i.e., the PRS in the full duplex region). The performance of a FD UE may vary based on the type of full duplex operation. FIG. 10 illustrates a sub-band full duplex (SBFD) in which the resource BWs are non-overlapping. In a SBFD operation, the FD UE may process the first DL PRS transmission 1012 and the second DL PRS transmission 1014 because the second DL PRS transmission 1014 does not overlap with the active UL BWP 1006. In an in-band full duplex (IBFD) operation, the active UL BWP 1006 may extend to create a partial overlap between the UL and DL resource BWs. For example, the active UL BWP 1006 may be extended by an amount indicated as 1006a in FIG. 10. The extension amount 1006a would cause an overlap region 1008 in the second DL PRS transmission 1014 with the active UL BWP. The overlap region 1008 indicates the portion of the sub-band where the UL and DL resources are colliding. In IBFD operations, the FD UE may be configured to process the portion of a DL PRS transmission which does not collide with the active UL BWP. For example, the FD UE may be configured to process the portion of the second DL PRS transmission 1014 which is not within the overlap region 1008.

Figure 11:
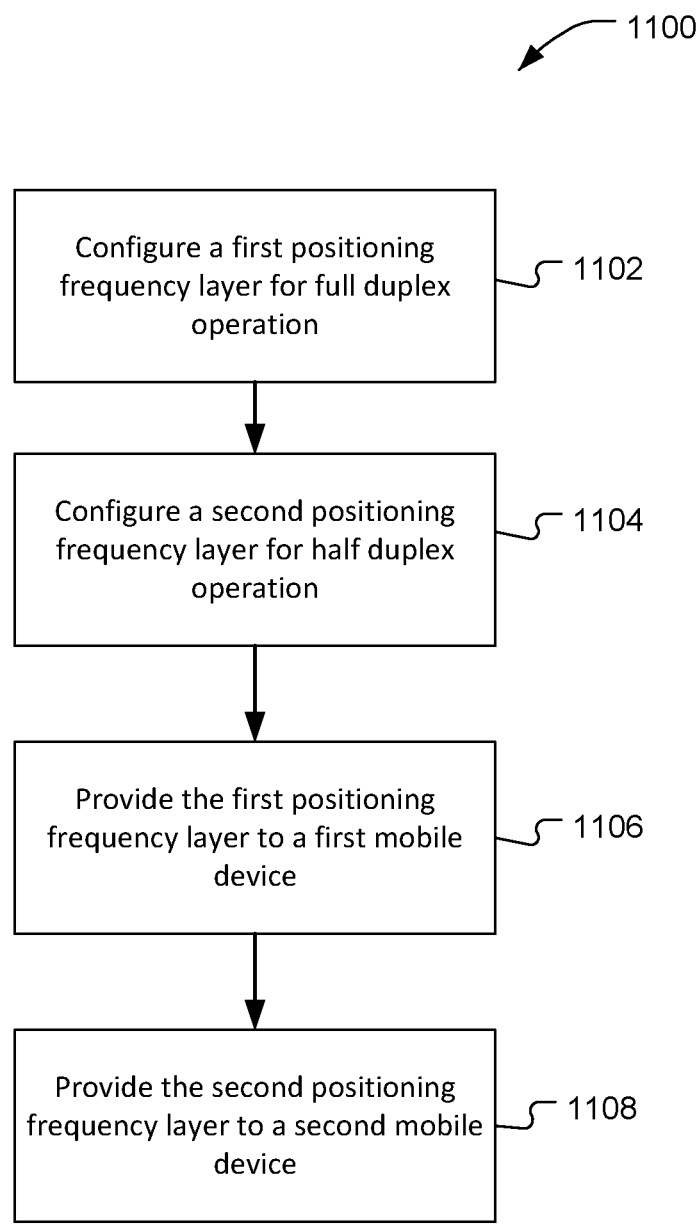
FIG. 11 is a flow diagram of an example method for configuring a network for half duplex and full duplex operations.

Referring to FIG. 11, with further reference to FIGS. 1-10, a method 1100 for configuring a network for half duplex and full duplex operations includes the stages shown. The method 1100 is, however, an example only and not limiting. The method 1100 may be altered, e.g., by having stages added, removed, rearranged, combined, performed concurrently, and/or having single stages split into multiple stages.

At stage, 1102 the method includes configuring a first position frequency layer for full duplex operation. A base station 110, or other network server, is a means for configuring a position frequency layer. A UE may be configured with one or more DL PRS Positioning Frequency Layer configuration(s) based on higher layer parameters (e.g., DL-PRS-PositioningFrequencyLayer). A positioning frequency layer consists of one or more PRS resource sets and may be defined by the subcarrier spacing (SCS) for the DL PRS resource, the cyclic prefix (CP) for the DL PRS resource, and an absolute frequency of the reference resource block (PointA). The UE may also be configured with one or more DL PRS resource set configuration(s). Each DL PRS resource set may include an ID, a periodicity value, a repetition factor, a time gap offset, a muting pattern, slot offset value, comb size, and the number of resource blocks configured for PRS transmission (see 3GPP TS 38.214 release 16). The DL PRS positioning frequency layer configuration may be extended to include a slot class field to associate the frequency configuration with either full duplex (FD) or half duplex (HD) operations. In an example, the positioning frequency layer may include information for FD and HD D2D operations. At stage 1102 the slot class field may be updated to indicate a first positioning frequency layer is configured for full duplex operations, and at stage 1104 the slot class field may be updated to indicate a second positioning frequency layer is configured for half duplex operations.

At stage 1106, the method includes providing the first positioning frequency layer to a first mobile device. A base station 110, is a means for providing a position frequency layer. The first mobile device may be a UE configured for full duplex operation. The base station 110 may be configured to provide the DL PRS resource sets to UE's via a messaging protocol such as RRC. The first mobile device may utilize the DL PRS resource set to process DL PRS transmissions which may span DL and UL regions such as depicted in FIGS. 9 and 10. At stage 1108, the base station may provide the second positioning frequency layer to mobile devices that are configured for half duplex operations. For example, the DL PRS resource sets in the second positioning frequency layer may enable a HD UE to skip the DL PRS reception/processing which may span DL and UL regions such as depicted in FIGS. 9 and 10.

Figure 12:
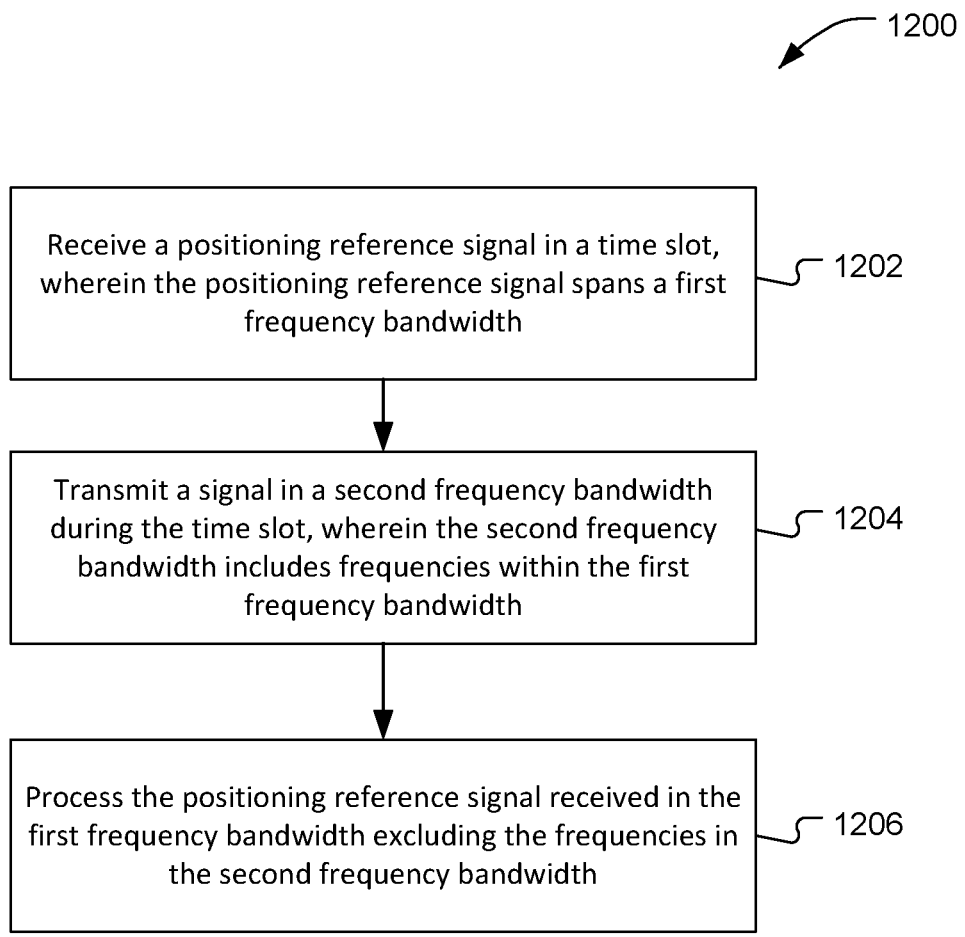
FIG. 12 is a flow diagram of an example method for processing a positioning reference signal in a sub-band full duplex scenario.

Referring to FIG. 12, with further reference to FIG. 9, a method 1200 for processing a positioning reference signal in a sub-band full duplex scenario includes the stages shown. The method 1200 is, however, an example only and not limiting. The method 1200 may be altered, e.g., by having stages added, removed, rearranged, combined, performed concurrently, and/or having single stages split into multiple stages.

At stage 1202, the method includes receiving a positioning reference signal in a time slot, wherein the positioning reference signal spans a first frequency bandwidth. A UE 120 is a means for receiving the positioning reference signal. The UE 120 may be configured for full duplex operations.

A base station 110 is configured to transmit PRS signals based on parameters determined in higher level applications and disseminated via signaling messages such as RRC. In an example, a UE may be configured to transmit PRS signals for FD D2D positioning applications. The UE 120 is configured to receive and process the PRS transmissions in the indicated time slots. As used herein, the term time slot may also include symbol slots, such as defined in NR specification. For example, the UE 120 may receive the second DL PRS transmission 904 which spans a first frequency bandwidth and may include both downlink and uplink regions.

At stage 1204, the method includes transmitting a signal in a second frequency bandwidth during the time slot, wherein the second frequency bandwidth includes frequencies within the first frequency bandwidth. The UE 120 is a means for transmitting the signal in the time slot. The UE 120 may be configured as a FD UE capable of simultaneously transmitting and receiving signals. The UE 120 may receive one or more control messages from a base station to configure the first frequency bandwidth and the second frequency bandwidth. In an example, radio resource control (RRC) signaling may be used to configure the first and second bandwidth. As depicted in FIG. 9 the UE 120 may transmit UL data (e.g., via PUSCH) during the time or symbol slots the second DL PRS transmission 904 is being received. The second DL PRS transmission 904 spans a DL region and an UL region of the spectrum 900. A sub-band portion 904a of the second DL PRS transmission 904 collides with the UL region. In an example, the UE 120 may be communicating with the FD base station such that the PRS signal may be received from the FD base station, and the UE may transmit signals to the FD base station (e.g., FIG. 3B). In an example, the UE 120 may be configured to communicate with multiple base station such that the PRS may be received from a first base station and the transmission from the UE may be an uplink to a second base station (e.g., FIG. 3C).

At stage 1206, the method includes processing the positioning reference signal received in the first frequency bandwidth excluding the frequencies in the second frequency bandwidth. The UE 120 is a means for processing the PRS signal. For example, the UE 120 is configured to process the second DL PRS transmission 904 which is not included in the sub-band portion 904a. Processing of the second DL PRS transmission 904 while excluding the colliding sub-band portion 904a will produce a reasonable correlation peak and enable a position estimate. In an example, the processed portions of the second DL PRS transmission 904 may be correlated with the first DL PRS transmission 902 to generate a correlation peak.

Figure 13:
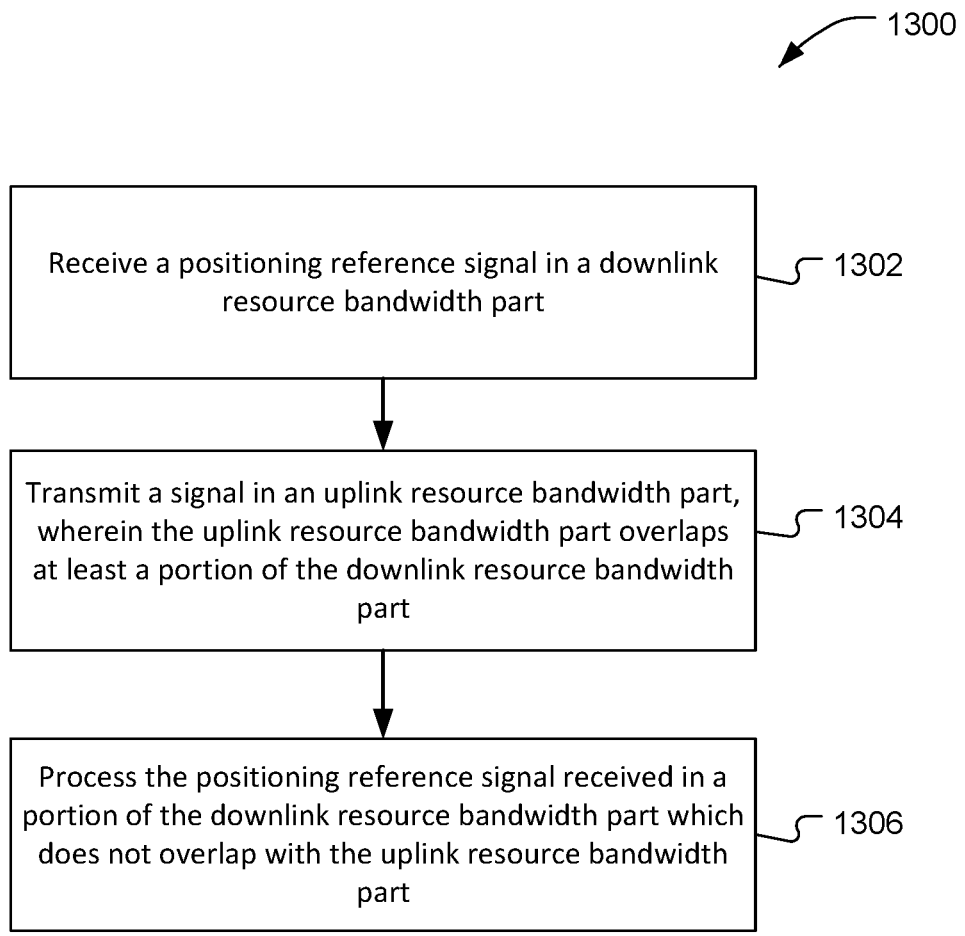
FIG. 13 is a flow diagram of an example method for processing a positioning reference signal in an in-band full duplex scenario.

Referring to FIG. 13, with further reference to FIG. 10, a method 1300 for processing a positioning reference signal in an in-band full duplex scenario includes the stages shown. The method 1300 is, however, an example only and not limiting. The method 1300 may be altered, e.g., by having stages added, removed, rearranged, combined, performed concurrently, and/or having single stages split into multiple stages.

At stage 1302, the method includes receiving a positioning reference signal in a downlink resource bandwidth part. A UE 120 is a means for receiving the positioning reference signal. The UE 120 may be configured for full duplex operations. A base station 110 is configured to transmit PRS signals based on parameters determined in higher level application and disseminated via signaling messages such as RRC. The UE 120 is configured to receive and process the PRS transmissions in the configured bandwidth parts (BWPs). For example, the UE 120 may be configured to receive configuration parameters for the first resource BW 1002 and the second resource BW 1004. The resource BWs 1002, 1004 include the respective first DL PRS transmission 1012 and the second DL PRS transmission 1014.

At stage 1304, the method includes transmitting a signal in an uplink resource bandwidth part, wherein the uplink resource bandwidth part overlaps at least a portion of the downlink resource bandwidth part. The UE 120 is a means for transmitting the signal in the uplink resource bandwidth part. The UE 120 may be configured as a FD UE capable of simultaneously transmitting and receiving signals. For example, as depicted in FIG. 10 the UE 120 may transmit UL data (e.g., via PUSCH) in the extended UL BWP 1006a simultaneously while receiving the second resource BW 1004, which includes the second DL PRS transmission 1014. In an example, the UE 120 may be communicating with the FD base station such that the PRS signal may be received from the FD base station, and the UE may transmit signals to the FD base station (e.g., FIG. 3B). In an example, the UE 120 may be configured to communicate with multiple base station such that the PRS may be received from a first base station and the transmission from the UE may be an uplink to a second base station (e.g., FIG. 3C).

At stage 1306, the method includes processing the positioning reference signal received in a portion of the downlink resource bandwidth part which does not overlap with the uplink resource bandwidth part. The UE 120 is a means for processing the PRS signal. In an example, the extended UL BWP 1006a overlaps with the second resource BW 1004. The UE 120 is configured to process the second DL PRS transmission 1014 which is not included in the overlap region 1008. Processing of the second the DL PRS transmission 1014 while excluding the overlap region 1008 will produce a reasonable correlation peak and enable a position estimate. In an example, the process portions of the second DL PRS transmission 1014 may be correlated with the first DL PRS transmission 1012 to generate a correlation peak.

Figure 14:
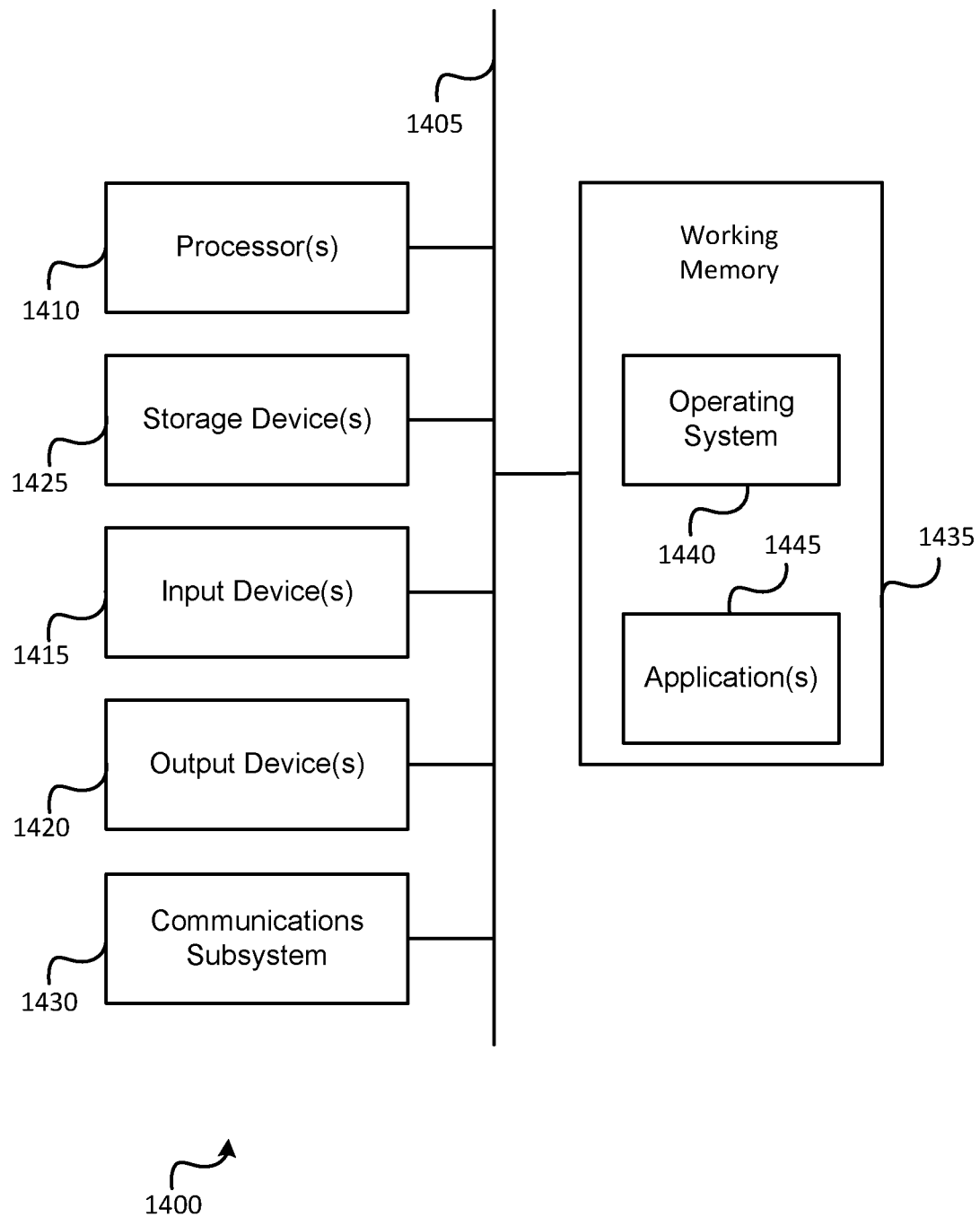
FIG. 14 illustrates a block diagram of an example of a computer system.

A computer system as illustrated in FIG. 14 may incorporate as part of the previously described computerized devices such as the BS 110, UE 120 and network controller 130. A computer system 1400 may be configured to perform the methods provided by various other embodiments, as described herein, and/or can function as a networked server, a mobile device, and/or a computer system. It should be noted that FIG. 14 is meant only to provide a generalized illustration of various components, any or all of which may be utilized as appropriate. FIG. 14, therefore, broadly illustrates how individual system elements may be implemented in a relatively separated or relatively more integrated manner.

The computer system 1400 is shown comprising hardware elements that can be electrically coupled via a bus 1405 (or may otherwise be in communication, as appropriate). The hardware elements may include one or more processors 1410, including without limitation one or more general-purpose processors and/or one or more special-purpose processors (such as digital signal processing chips, graphics acceleration processors, and/or the like); one or more input devices 1415, which can include without limitation a mouse, a keyboard and/or the like; and one or more output devices 1420, which can include without limitation a display device, a printer and/or the like.

The computer system 1400 may further include (and/or be in communication with) one or more non-transitory storage devices 1425, which can comprise, without limitation, local and/or network accessible storage, and/or can include, without limitation, a disk drive, a drive array, an optical storage device, solid-state storage devices such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1400 might also include a communications subsystem 1430, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 1430 may permit data to be exchanged with a network, other computer systems, and/or any other devices described herein. In many embodiments, the computer system 1400 will further comprise a working memory 1435, which can include a RAM or ROM device, as described above.

The computer system 1400 also can comprise software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 1425 described above. In some cases, the storage medium might be incorporated within a computer system, such as the system 1400. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1400 and/or might take the form of source and/or installable code, which, upon compilation and/or installation on the computer system 1400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1400) to perform methods in accordance with various embodiments of the invention. According to a set of embodiments, some or all of the procedures of such methods are performed by the computer system 1400 in response to processor 1410 executing one or more sequences of one or more instructions (which might be incorporated into the operating system 1440 and/or other code, such as an application program 1445) contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1400, various computer-readable media might be involved in providing instructions/code to processor(s) 1410 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1425. Volatile media include, without limitation, dynamic memory, such as the working memory 1435. Transmission media include, without limitation, coaxial cables, copper wire and fiber optics, including the wires that comprise the bus 1405, as well as the various components of the communication subsystem 1430 (and/or the media by which the communications subsystem 1430 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1400. These signals, which might be in the form of electromagnetic signals, acoustic signals, optical signals and/or the like, are all examples of carrier waves on which instructions can be encoded, in accordance with various embodiments of the invention.

The communications subsystem 1430 (and/or components thereof) generally will receive the signals, and the bus 1405 then might carry the signals (and/or the data, instructions, etc. carried by the signals) to the working memory 1435, from which the processor(s) 1405 retrieves and executes the instructions. The instructions received by the working memory 1435 may optionally be stored on a storage device 1425 either before or after execution by the processor(s) 1410.

Figure 15:
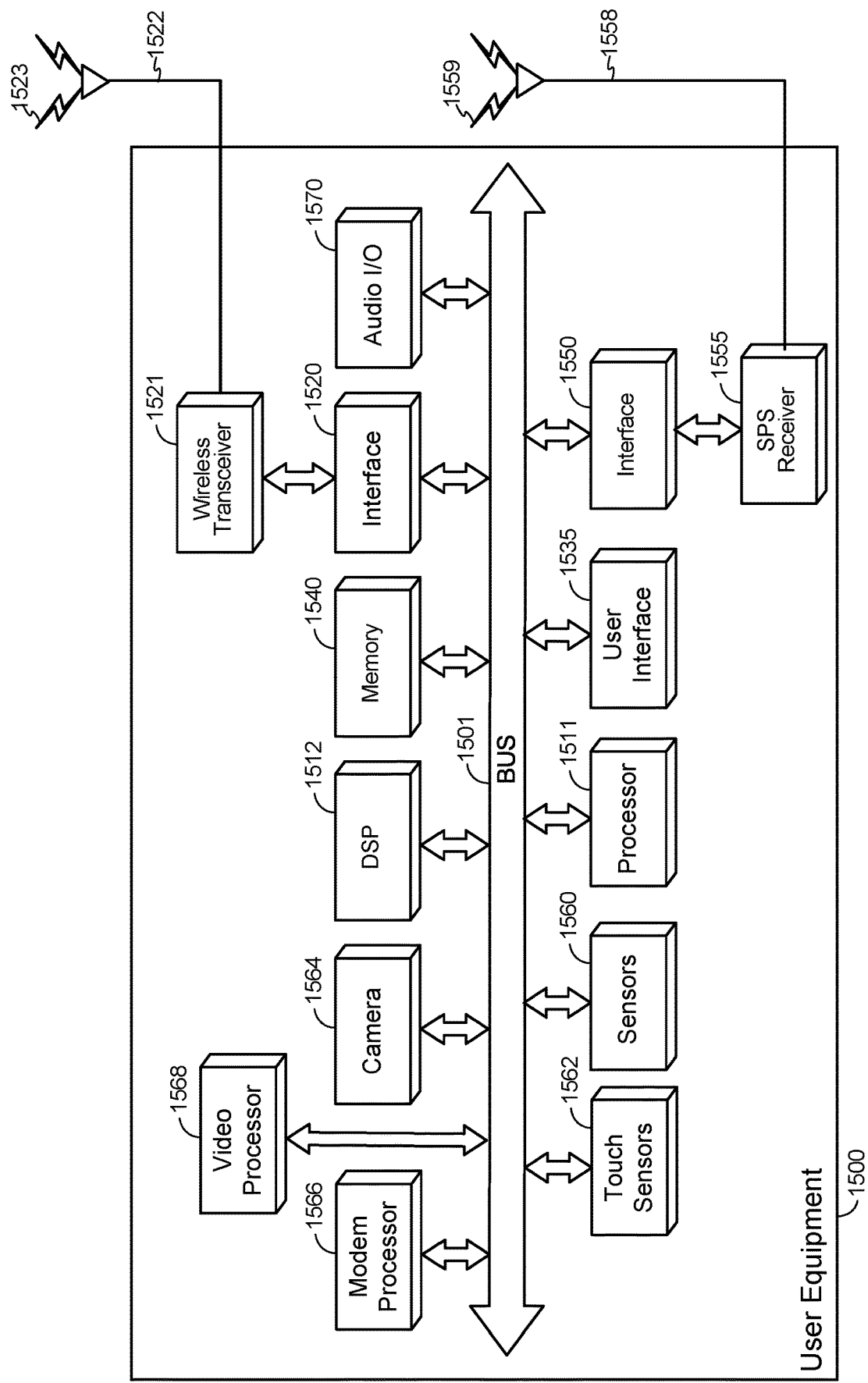
FIG. 15 is a block diagram of an example mobile device.

Referring to FIG. 15, a schematic diagram of a mobile device 1500 according to an embodiment is shown. The UE 120 as shown in FIG. 1 may comprise one or more features of the mobile device 1500 shown in FIG. 15. In certain embodiments, the mobile device 1500 may comprise a wireless transceiver 1521 which is capable of transmitting and receiving wireless signals 1523 via a wireless antenna 1522 over a wireless communication network. A wireless transceiver 1521 may be connected to a bus 1501 by a wireless transceiver bus interface 1520. The wireless transceiver bus interface 1520 may, in some embodiments, be at least partially integrated with the wireless transceiver 1521. Some embodiments may include multiple wireless transceivers 1521 and wireless antennas 1522 to enable transmitting and/or receiving signals in full or half duplex modes according to corresponding multiple wireless communication standards such as, for example, versions of IEEE Standard 802.11, CDMA, WCDMA, LTE, UMTS, GSM, AMPS, Zigbee, Bluetooth®, and a 5G or NR radio interface defined by 3GPP, just to name a few examples. In a particular implementation, the wireless transceiver 1521 may receive and acquire a downlink signal comprising a terrestrial positioning signal such as a DL PRS. For example, the wireless transceiver 1521 may process an acquired terrestrial positioning signal sufficiently to enable detection of timing of the acquired terrestrial positioning signal.

The mobile device 1500 may comprise an SPS receiver 1555 capable of receiving and acquiring SPS signals 1559 via an SPS antenna 1552 (which may be the same as the antenna 1522 in some embodiments). The SPS receiver 1555 may process, in whole or in part, the acquired SPS signals 1559 for estimating a location of the mobile device 1500. One or more general-purpose processor(s) 1511, a memory 1540, one or more digital signal processor(s) (DSP(s)) 1512, and/or specialized processors (not shown) may be utilized to process acquired SPS signals, in whole or in part, and/or to calculate an estimated location of the mobile device 1500, in conjunction with the SPS receiver 1555. Storage of SPS, TPS or other signals (e.g., signals acquired from the wireless transceiver 1521) or storage of measurements of these signals for use in performing positioning operations may be performed in the memory 1540 or registers (not shown). The general-purpose processor(s) 1511, the memory 1540, the DSP(s) 1512, and/or specialized processors may provide or support a location engine for use in processing measurements to estimate a location of the mobile device 1500. For example, the general-purpose processor(s) 1511 or the DSP(s) 1512 may process a downlink signal acquired by the wireless transceiver 1521 to, for example, make measurements of RSSI, RTT, AOA, TOA, RSTD, RSRQ and/or RSRQ.

Also shown in FIG. 15, the DSP(s) 1512 and the general-purpose processor(s) 1511 may be connected to the memory 1540 through bus the 1501. A particular bus interface (not shown) may be integrated with the DSP(s) 1512, the general-purpose processor(s) 1511, and the memory 1540. In various embodiments, functions may be performed in response to execution of one or more machine-readable instructions stored in the memory 1540 such as on a computer-readable storage medium, such as RAM, ROM, FLASH, or disc drive, just to name a few examples. The one or more instructions may be executable by the general-purpose processor(s) 1511, specialized processors, or the DSP(s) 1512. The memory 1540 may comprise a non-transitory, processor-readable memory and/or a computer-readable memory that stores software code (programming code, instructions, etc.) that are executable by the processor(s) 1511 and/or the DSP(s) 1512 to perform functions described herein.

Also shown in FIG. 15, a user interface 1535 may comprise any one of several devices such as, for example, a speaker, microphone, display device, vibration device, keyboard, touch screen, just to name a few examples. In a particular implementation, the user interface 1535 may enable a user to interact with one or more applications hosted on the mobile device 1500. For example, devices of the user interface 1535 may store analog and/or digital signals on the memory 1540 to be further processed by the DSP(s) 1512 or the general purpose processor 1511 in response to action from a user. Similarly, applications hosted on the mobile device 1500 may store analog or digital signals on the memory 1540 to present an output signal to a user. The mobile device 1500 may optionally include a dedicated audio input/output (I/O) device 1570 comprising, for example, a dedicated speaker, microphone, digital to analog circuitry, analog to digital circuitry, amplifiers and/or gain control. This is merely an example of how an audio I/O may be implemented in a mobile device, and claimed subject matter is not limited in this respect. The mobile device 1500 may comprise touch sensors 1562 responsive to touching or pressure on a keyboard or touch screen device.

The mobile device 1500 may comprise a dedicated camera device 1564 for capturing still or moving imagery. The camera device 1564 may comprise, for example, an imaging sensor (e.g., charge coupled device or CMOS imager), lens, analog-to-digital circuitry, frame buffers, just to name a few examples. Additional processing, conditioning, encoding, and/or compression of signals representing captured images may be performed at the general purpose/application processor 1511 and/or the DSP(s) 1512. A dedicated video processor 1562 may perform conditioning, encoding, compression or manipulation of signals representing captured images. A video processor 1568 may decode/decompress stored image data for presentation on a display device (not shown) on the mobile device 1500.

The mobile device 1500 may also comprise sensors 1560 coupled to the bus 1501 which may include, for example, inertial sensors and environment sensors. Inertial sensors of the sensors 1560 may comprise, for example, accelerometers (e.g., collectively responding to acceleration of the mobile device 1500 in three dimensions), one or more gyroscopes or one or more magnetometers (e.g., to support one or more compass applications). Environment sensors of the mobile device 1500 may comprise, for example, temperature sensors, barometric pressure sensors, ambient light sensors, camera imagers, microphones, just to name few examples. The sensors 1560 may generate analog and/or digital signals that may be stored in the memory 1540 and processed by the DPS(s) 1512 or the general purpose application processor 1511 in support of one or more applications such as, for example, applications directed to positioning or navigation operations.

The mobile device 1500 may comprise a dedicated modem processor 1566 capable of performing baseband processing of signals received and downconverted at the wireless transceiver 1521 or the SPS receiver 1555. The modem processor 1566 may perform baseband processing of signals to be upconverted for transmission by the wireless transceiver 1521. In alternative implementations, instead of having a dedicated modem processor, baseband processing may be performed by a general purpose processor or DSP (e.g., the general purpose/application processor 1511 or the DSP(s) 1512). These are merely examples of structures that may perform baseband processing, and claimed subject matter is not limited in this respect.

Figure 16:
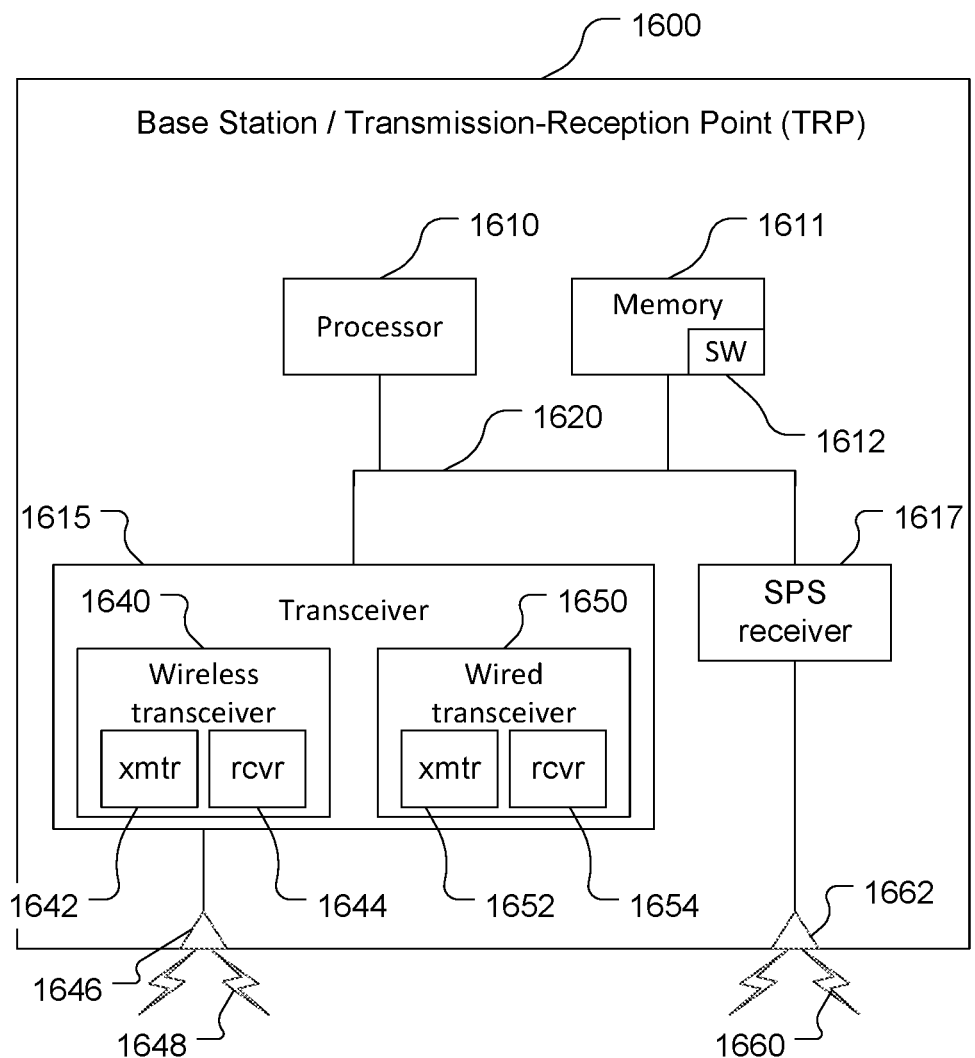
FIG. 16 is a block diagram of an example base station.

Referring also to FIG. 16, an example of a TRP 1600 of the BSs 110*a-c* comprises a computing platform including a processor 1610, memory 1611 including software (SW) 1612, a transceiver 1615, and (optionally) an SPS receiver 1617. The processor 1610, the memory 1611, the transceiver 1615, and the SPS receiver 1617 may be communicatively coupled to each other by a bus 1620 (which may be configured, e.g., for optical and/or electrical communication). One or more of the shown apparatus (e.g., a wireless interface and/or the SPS receiver 1617) may be omitted from the TRP 1600. The SPS receiver 1617 may be configured similarly to the SPS receiver 1517 to be capable of receiving and acquiring SPS signals 1660 via an SPS antenna 1662. The processor 1610 may include one or more intelligent hardware devices, e.g., a central processing unit (CPU), a microcontroller, an application specific integrated circuit (ASIC), etc. The processor 1610 may comprise multiple processors (e.g., including a general-purpose/application processor, a DSP, a modem processor, a video processor, and/or a sensor processor as shown in FIG. 4). The memory 1611 is a non-transitory storage medium that may include random access memory (RAM)), flash memory, disc memory, and/or read-only memory (ROM), etc. The memory 1611 stores the software 1612 which may be processor-readable, processor-executable software code containing instructions that are configured to, when executed, cause the processor 1610 to perform various functions described herein. Alternatively, the software 1612 may not be directly executable by the processor 1610 but may be configured to cause the processor 1610, e.g., when compiled and executed, to perform the functions. The description may refer only to the processor 1610 performing a function, but this includes other implementations such as where the processor 1610 executes software and/or firmware. The description may refer to the processor 1610 performing a function as shorthand for one or more of the processors contained in the processor 1610 performing the function. The description may refer to the TRP 1600 performing a function as shorthand for one or more appropriate components of the TRP 1600 (and thus of one of the BSs 110*a-c*) performing the function. The processor 1610 may include a memory with stored instructions in addition to and/or instead of the memory 1611. Functionality of the processor 1610 is discussed more fully below.

The transceiver 1615 may include a wireless transceiver 1640 and a wired transceiver 1650 configured to communicate with other devices through wireless connections and wired connections, respectively. For example, the wireless transceiver 1640 may include a transmitter 1642 and receiver 1644 coupled to one or more antennas 1646 for transmitting (e.g., on one or more uplink channels) and/or receiving (e.g., on one or more downlink channels) wireless signals 1648 and transducing signals from the wireless signals 1648 to wired (e.g., electrical and/or optical) signals and from wired (e.g., electrical and/or optical) signals to the wireless signals 1648. Thus, the transmitter 1642 may include multiple transmitters that may be discrete components or combined/integrated components, and/or the receiver 1644 may include multiple receivers that may be discrete components or combined/integrated components. The wireless transceiver 1640 may be configured to communicate signals (e.g., with the UE 1500, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 1650 may include a transmitter 1652 and a receiver 1654 configured for wired communication, e.g., with the network controller 130 to send communications to, and receive communications from, the network controller 130, for example. The transmitter 1652 may include multiple transmitters that may be discrete components or combined/integrated components, and/or the receiver 1654 may include multiple receivers that may be discrete components or combined/integrated components. The wired transceiver 1650 may be configured, e.g., for optical communication and/or electrical communication.

The configuration of the TRP 1600 shown in FIG. 16 is an example and not limiting of the invention, including the claims, and other configurations may be used. For example, the description herein discusses that the TRP 1600 is configured to perform or performs several functions, but one or more of these functions may be performed by the computer 1400 and/or the UE 1500 (i.e., the UE 1500 may be configured to perform one or more of these functions).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for wireless communication by a base station, comprising:
  configuring a first positioning frequency layer for full duplex operation, wherein the first positioning frequency layer is defined by a first subcarrier spacing (SCS), a first cyclic prefix (CP) type, and a first bandwidth;
  configuring a second positioning frequency layer for half duplex operation, wherein the second positioning frequency layer is defined by a second subcarrier spacing (SCS), a second cyclic prefix (CP) type, and a second bandwidth that are respectively different from the first subcarrier spacing (SCS), the first cyclic prefix (CP) type, and the first bandwidth;
  providing the first positioning frequency layer to a first mobile device; and
  providing the second positioning frequency layer to a second mobile device.

2. The method of claim 1 wherein configuring the first positioning frequency layer for full duplex operation comprises configuring a slot class field to indicate full duplex operation.

3. The method of claim 1 wherein configuring the second positioning frequency layer for half duplex operation comprises configuring a slot class field to indicate half duplex operation.

4. The method of claim 1 wherein providing the first positioning frequency layer to the first mobile device and providing the second positioning frequency layer to the second mobile device includes transmitting one or more radio resource control signals to the first mobile device and the second mobile device.

5. An apparatus for wireless communication, comprising:
  a memory;
  at least one transceiver;
  at least one processor communicatively coupled to the at least one transceiver and the memory, and configured to:
    configure a first positioning frequency layer for full duplex operation, wherein the first positioning frequency layer is defined by a first subcarrier spacing (SCS), a first cyclic prefix (CP) type, and a first bandwidth;
    configure a second positioning frequency layer for half duplex operation, wherein the second positioning frequency layer is defined by a second subcarrier spacing (SCS), a second cyclic prefix (CP) type, and a second bandwidth that are respectively different from the first subcarrier spacing (SCS), the first cyclic prefix (CP) type, and the first bandwidth;
    provide the first positioning frequency layer to a first mobile device; and
    provide the second positioning frequency layer to a second mobile device.

6. The apparatus of claim 5 wherein the at least one processor is configured to configure a slot class field to indicate full duplex operation.

7. The apparatus of claim 5 wherein the at least one processor is configured to configure a slot class field to indicate half duplex operation.

8. The apparatus of claim 5 wherein the at least one transceiver is configured to transmit one or more radio resource control signals to the first mobile device and the second mobile device.

9. An apparatus for wireless communication by a base station, comprising:
  means for configuring a first positioning frequency layer for full duplex operation, wherein the first positioning frequency layer is defined by a first subcarrier spacing (SCS), a first cyclic prefix (CP) type, and a first bandwidth;
  means for configuring a second positioning frequency layer for half duplex operation, wherein the second positioning frequency layer is defined by a second subcarrier spacing (SCS), a second cyclic prefix (CP) type, and a second bandwidth that are respectively different from the first subcarrier spacing (SCS), the first cyclic prefix (CP) type, and the first bandwidth;
  means for providing the first positioning frequency layer to a first mobile device; and
  means for providing the second positioning frequency layer to a second mobile device.

10. The apparatus of claim 9 wherein the means for configuring the first positioning frequency layer for full duplex operation comprises means for configuring a slot class field to indicate full duplex operation.

11. The apparatus of claim 9 wherein the means for configuring the second positioning frequency layer for half duplex operation comprises means for configuring a slot class field to indicate half duplex operation.

12. The apparatus of claim 9 wherein the means for providing the first positioning frequency layer to the first mobile device and the means for providing the second positioning frequency layer to the second mobile device includes means for transmitting one or more radio resource control signals to the first mobile device and the second mobile device.

13. A non-transitory processor-readable storage medium comprising processor-readable instructions configured to cause one or more processors in a user equipment (UE) to communicate wirelessly, comprising:
  code for configuring a first positioning frequency layer for full duplex operation, wherein the first positioning frequency layer is defined by a first subcarrier spacing (SCS), a first cyclic prefix (CP) type, and a first bandwidth;
  code for configuring a second positioning frequency layer for half duplex operation, wherein the second positioning frequency layer is defined by a second subcarrier spacing (SCS), a second cyclic prefix (CP) type, and a second bandwidth that are respectively different from the first subcarrier spacing (SCS), the first cyclic prefix (CP) type, and the first bandwidth;
  code for providing the first positioning frequency layer to a first mobile device; and
  code for providing the second positioning frequency layer to a second mobile device.

14. The non-transitory processor-readable storage medium of claim 13 wherein the code for configuring the first positioning frequency layer for full duplex operation comprises code for configuring a slot class field to indicate full duplex operation.

15. The non-transitory processor-readable storage medium of claim 13 wherein the code for configuring the second positioning frequency layer for half duplex operation comprises code for configuring a slot class field to indicate half duplex operation.

16. The non-transitory processor-readable storage medium of claim 13 wherein the code for providing the first positioning frequency layer to the first mobile device and the code for providing the second positioning frequency layer to the second mobile device includes code for transmitting one or more radio resource control signals to the first mobile device and the second mobile device.

* * * * *